(12) United States Patent
Asano et al.

(10) Patent No.: US 8,911,225 B2
(45) Date of Patent: Dec. 16, 2014

(54) COMPRESSION-MOLDING APPARATUS AND COMPRESSION-MOLDING METHOD

(75) Inventors: Yutaka Asano, Kanagawa (JP); Norihisa Hirota, Kanagawa (JP); Jotaro Nagao, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 297 days.

(21) Appl. No.: 12/677,574

(22) PCT Filed: Oct. 23, 2008

(86) PCT No.: PCT/JP2008/069229
§ 371 (c)(1),
(2), (4) Date: Mar. 11, 2010

(87) PCT Pub. No.: WO2009/054451
PCT Pub. Date: Apr. 30, 2009

(65) Prior Publication Data
US 2010/0201032 A1    Aug. 12, 2010

(30) Foreign Application Priority Data

Oct. 24, 2007 (JP) .................................. 2007-276017
Jun. 27, 2008 (JP) .................................. 2008-168678

(51) Int. Cl.
| | | |
|---|---|---|
| B29C 43/34 | (2006.01) | |
| B29C 31/04 | (2006.01) | |
| B29C 49/02 | (2006.01) | |
| B29C 43/08 | (2006.01) | |
| B29C 43/36 | (2006.01) | |
| B29B 11/12 | (2006.01) | |
| B29C 49/22 | (2006.01) | |
| B29K 67/00 | (2006.01) | |
| B29L 31/00 | (2006.01) | |

(52) U.S. Cl.
CPC .............. *B29C 31/048* (2013.01); *B29C 49/02* (2013.01); *B29C 43/08* (2013.01);LISTCONT

(58) Field of Classification Search
USPC ......... 425/352, 354, 355, 121, 125, 256, 258, 425/261, 346, 348 R, 139, 236, 537, 350, 425/351, 422, 444, 298, 299
See application file for complete search history.

(56) References Cited

U.S. PATENT DOCUMENTS 3,192,569 A * 7/1965 Knabel .......................... 425/422
4,913,871 A * 4/1990 Kawaguchi et al. .......... 264/294

(Continued)

FOREIGN PATENT DOCUMENTS

EP    1101586    5/2001
EP    2 206 592    7/2010

(Continued)

OTHER PUBLICATIONS

English machine translation of JP 2004-284082, retrieved from JPO database Oct. 11, 2012.*

(Continued)

*Primary Examiner* — Timothy Kennedy
(74) *Attorney, Agent, or Firm* — Greenblum & Bernstein, P.L.C.

(57) ABSTRACT

[Problem] To suppress the deviation of a synthetic resin to be fed to a metal mold and to enable the to-be-compression-molded synthetic resin to be easily molded into a shape of a pre-molded article that is to be molded.
[Means for Solution] A female mold 31 includes a moving rod 34 and female mold body 33 surrounding the moving rod 34, the female mold body 33 forming a cavity 33a that is opened upward, the moving rod 34 moving up and down between a normal position and an elevated position above the normal position, and when a synthetic resin 8 is to be fallen down from the a synthetic resin cutting/holding unit 14, the moving rod 34 moves to the elevated position so that the synthetic resin 8 falls down on the upper surface of the center member.

16 Claims, 22 Drawing Sheets

(52) U.S. Cl.
CPC ......... *B29C 2043/3634* (2013.01); *B29B 11/12* (2013.01); *B29C 2043/3444* (2013.01); *B29C 49/22* (2013.01); *B29C 2043/3472* (2013.01); *B29C 2043/3461* (2013.01); *B29C 2023/12* (2013.01); *B29C 2043/3433* (2013.01); *B29K 2067/00* (2013.01); *B29L 2031/712* (2013.01); *B29C 43/34* (2013.01)
USPC ........... 425/256; 425/298; 425/299; 425/352; 425/354; 425/121; 425/125; 425/258; 425/261; 425/346; 425/348 R; 425/139; 425/236; 425/537; 425/350; 425/351; 425/422; 425/444

(56) References Cited

U.S. PATENT DOCUMENTS

| | | | |
|---|---|---|---|
| 4,943,405 | A | 7/1990 | Keller et al. |
| 5,110,280 | A | 5/1992 | Kawaguchi et al. |
| 5,603,964 | A | 2/1997 | Rote et al. |
| 6,422,854 | B1 | 7/2002 | Dennis et al. |
| 7,607,909 | B2 | 10/2009 | Bergami et al. |
| 2002/0088767 | A1* | 7/2002 | Saito et al. ............ 215/40 |
| 2007/0007694 | A1 | 1/2007 | Nemoto et al. |
| 2007/0196531 | A1 | 8/2007 | Parrinello et al. |
| 2009/0014915 | A1 | 1/2009 | Asano et al. |

FOREIGN PATENT DOCUMENTS

| | | |
|---|---|---|
| GB | 2178359 | 2/1987 |
| JP | 56-136865 | 10/1981 |
| JP | 2-098415 | 4/1990 |
| JP | 6-2359 | 1/1994 |
| JP | 7-61656 | 7/1995 |
| JP | 2000-280248 | 10/2000 |
| JP | 2003127211 A * | 5/2003 |
| JP | 2004-284082 | 10/2004 |
| JP | 2006-198965 | 8/2006 |
| JP | 2007-508966 | 4/2007 |
| JP | 2007-229981 | 9/2007 |
| WO | 03/047831 | 6/2003 |
| WO | 2005/007378 | 1/2005 |
| WO | 2006/109108 | 10/2006 |
| WO | 2007/094518 | 8/2007 |

OTHER PUBLICATIONS

JPO machine translation of JP 2003-127211, retrieved Jan. 31, 2014.*
International Search Report dated Jan. 20, 2009 that issued with respect to PCT/JP2008/069229.
EP search report attached to herein listed EP 2 206 592 A1 and designed as pp. 40-43 of this document, (Jan. 20, 2013).
Japanese Office Action citing JP 56-136865 and issued in counterpart JP application No. 2010-521719, (Jul. 9, 2013).

* cited by examiner

Fig. 20
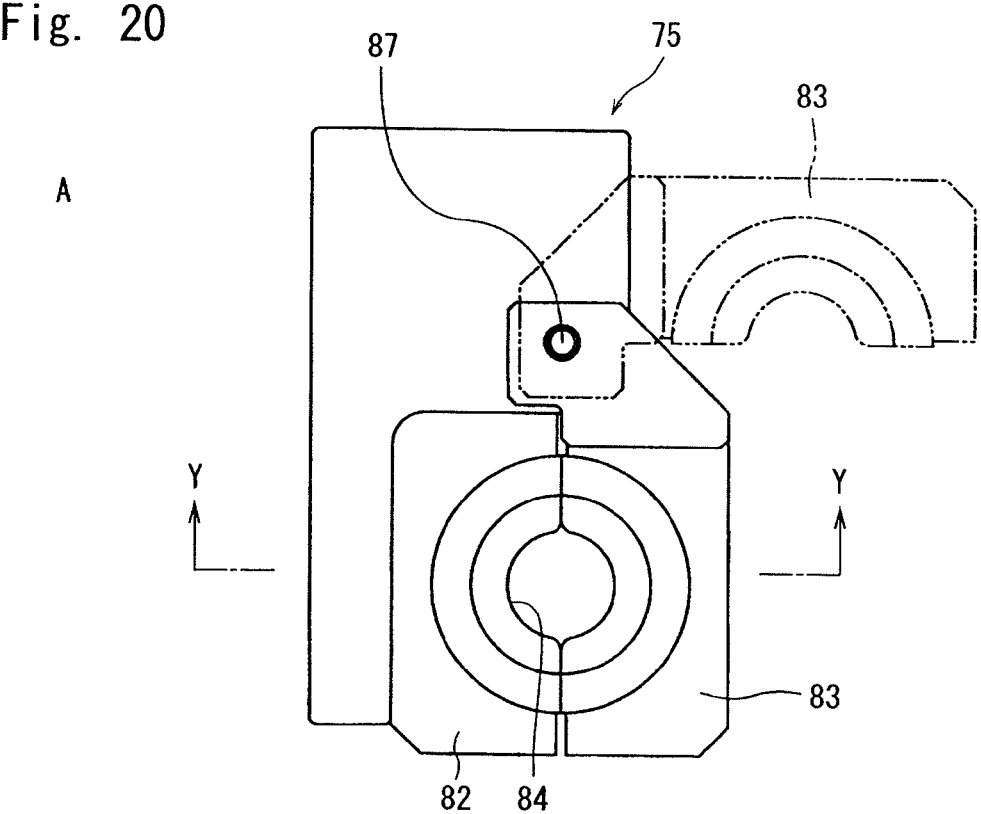
A
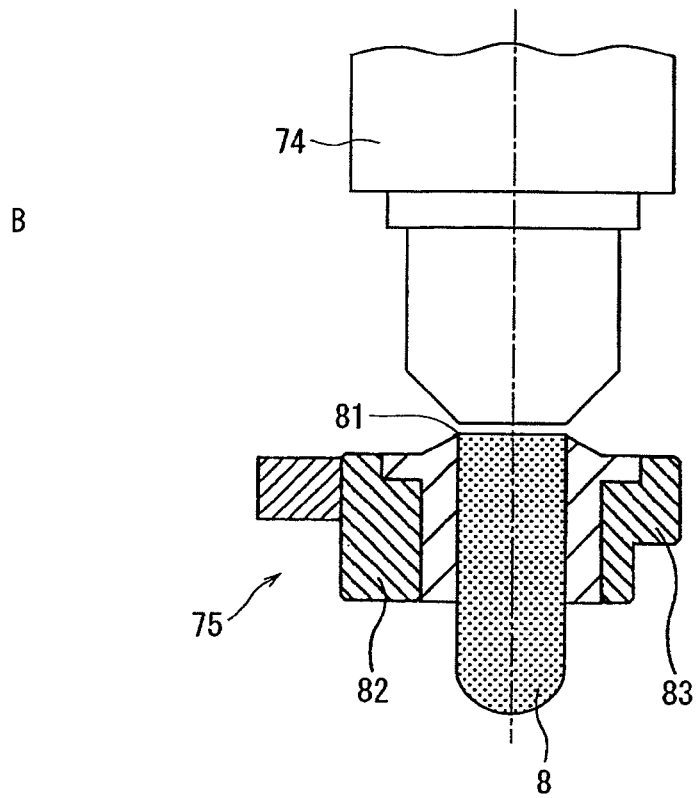
B

COMPRESSION-MOLDING APPARATUS AND COMPRESSION-MOLDING METHOD

TECHNICAL FIELD

This invention relates to a compression-molding apparatus for compression-molding a lid, a container and a preform of a container that are obtained by molding a synthetic resin.

BACKGROUND ART

Synthetic resin containers made from a synthetic resin such as polypropylene (PP) or polyethylene terephthalate (PET) have been widely put into practical use as containers for beverages. A preform that is to be formed into a synthetic resin container by blow-molding can be obtained by compression-molding by using a compression-molding machine. In executing the compression-molding, the synthetic resin in a molten state is extruded through an ejection port of a die head of an extruder and is fed to the compression-molding apparatus by a resin feeder. The compression-molding apparatus compression-molds the synthetic resin in a molten state to mold a pre-molded article and, thereafter, blow-molds the pre-molded article into a container.

The following patent document 1 discloses a method of compression-molding a pre-molded article. According to this method of compression-molding, a synthetic resin in a molten state extruded from an extrusion opening of an extruder is cut by a cutter, and the synthetic resin (bullet) after cut is conveyed to a resin-feed zone of a compression-molding apparatus. In the resin-feed zone, the synthetic resin after cut is allowed to fall down into a recessed portion that is open upward in a metal mold that is in an open state through guide means located at a predetermined guide position. Thereafter, the metal mold is closed and the synthetic resin fallen down into the recessed portion is compression-molded into a predetermined shape.

The above means for guiding the synthetic resin has an upper guide passage of an inverted conical shape of which the sectional area gradually decreases downward and a lower guide passage of an upright cylindrical shape following the upper guide passage. The lower guide passage has a sectional shape substantially the same as the sectional shape at the lower end of the upper guide passage. At the time when the synthetic resin falls down into the recessed portion of the metal mold through the guide means, the guide means is brought to a guide position where the center axes of the upper guide passage and of the lower guide passage are brought into agreement with the center axis of the recessed portion, so that the synthetic resin is brought to the central position of the recessed portion while passing through the upper guide passage and the lower guide passage of guide means.

Patent document 1: JP-A-2000-280248 (discloses positioning of a synthetic resin)
Patent document 2: JP-T-2007-508966 (discloses a metal mold including a male mold as the lower mold and a female mold as the upper mold)
Patent document 3: JP-B-6-2359 (discloses a metal mold including a male mold as the lower mold and a female mold as the upper mold)

DISCLOSURE OF THE INVENTION

Problems to be Solved by the Invention

However, it became obvious that the compression-molding method disclosed in the patent document 1 has a problem that must be solved as described below. Concerning, for example, a metal mold for compression-molding a pre-molded article for forming a container having a wide mouth, the recessed portion has a relatively large inner diameter; i.e., the inner diameter of the recessed portion becomes considerably large relative to the outer diameter of the synthetic resin that is cut. When the inner diameter of the recessed portion is considerably large relative to the outer diameter of the synthetic resin, in particular, the synthetic resin which was once brought to the center of the recessed portion while passing through the guide means tends to move away from the center of the recessed portion after having fallen down into the recessed portion and, therefore, tends to be positioned being deviated in the recessed portion.

The present invention was accomplished in view of the above circumstances, and has an object of providing a compression-molding apparatus which enables the synthetic resin to be positioned in a recessed portion as desired by sufficiently suppressing the deviation of the synthetic resin in the recessed portion of the metal mold and, further, enables the to-be-compression-molded synthetic resin to be easily molded into a shape of a molded article that is to be obtained or into the shape of a pre-molded article.

Means for Solving the Problems

In order to achieve the above object, the compression-molding apparatus of the present invention comprises a female mold member having a recessed molding portion, a male mold member that moves up and down relative to the female mold member and is selectively brought to a closed position where it defines a molding space in cooperation with the female mold member and to an open position where it is positioned separated away from the female mold member, and synthetic resin material introduction means (synthetic resin feeder) positioned between the female mold member and the male mold member when the male mold member is at the open position, the synthetic resin introduction means permitting a synthetic resin material which it is holding to fall down, wherein the recessed molding portion of the female mold member is opened downward, the male mold member is arranged under the female mold member, and the synthetic resin material falls from the synthetic resin material introduction means down onto the male mold member.

In order to achieve the above object, further, the compression-molding apparatus of the present invention comprises a female mold member having a recessed molding portion (cavity) which is opened upward, a male mold member arranged over the female mold member, moves up and down relative to the female mold member and is selectively brought to a closed position where it defines a molding space in cooperation with the female mold member and to an open position where it is separated away from the female mold member, and synthetic resin material introduction means (synthetic resin feeder) positioned between the female mold member and the male mold member when the male mold member is at the open position, the synthetic resin introduction means permitting a synthetic resin material which it is holding to fall down, wherein the female mold member includes a center member (moving rod) and a circumferential member (female mold body) surrounding the center member, the circumferential member is forming a recessed portion that is opened upward, the center member moves up and down between a normal position where the upper surface thereof defines the recessed molding portion in cooperation with the recessed portion of the circumferential member and an elevated position moved upward above the normal position, and when the synthetic resin material is to be fallen down from the synthetic resin material introduction means, the center member moves to the elevated position so that the synthetic resin material falls down on the upper surface (placing surface) of the center member.

The synthetic resin material introduction means of the compression-molding apparatus can be provided with gas stream jet means (jet nozzle) for forcibly urging the synthetic resin material downward by acting a downwardly directed gas stream onto the synthetic resin material that is being held.

The synthetic resin material introduction means of the compression-molding apparatus can be provided with a push-down member (lift rod) that acts on the synthetic material that is being held to forcibly urge it downward.

In the compression-molding apparatus, the synthetic resin material is pre-molded by forcibly continuing the urging by the jet of gas flow from the gas stream jet means or by the push-down member even after the synthetic resin material falling down from the synthetic resin material introduction means has reached the upper surface of the center member of the female mold member or the male mold member.

In order to achieve the above object, the compression-molding apparatus of the present invention comprises an upper metal mold (female metal mold or male metal mold) and a lower metal mold (male metal mold or female metal mold) for compression-molding a synthetic resin material, and means (cutting/holding unit) for introducing the synthetic resin material, wherein the introduction means moves down in a state where the synthetic resin material is protruding downward and liberates the synthetic resin material upon pushing it onto the lower metal mold.

In the compression-molding apparatus, the length of the introduction means in the up-and-down direction can be set to be smaller than the length in the up-and-down direction of the synthetic resin material that is being held.

The compression-molding apparatus can be further provided with means (jet nozzle or lift rod) for forcibly urging down the synthetic resin material that is held.

In order to achieve the above object, the compression-molding method of the present invention comprises holding a synthetic resin material in a manner that the synthetic resin material protrudes downward from the lower end of introduction means, conveying the introduction means to just over a lower metal mold, moving the introduction means down to push the synthetic resin material onto the lower metal mold, and liberating the synthetic resin material from the introduction means to thereby compression-mold the synthetic resin material by the lower metal mold and the upper metal mold.

In the compression-molding method, the synthetic resin material can be molded into any shape prior to compression-molding the synthetic resin material by the lower metal mold and the upper metal mold.

If described in detail, the invention is concerned with the compression-molding apparatus comprising a female mold member having a recessed molding portion (cavity) which is opened upward (or downward), a male mold member arranged over (or under) the female mold member, moves up and down relative to the female mold member and is selectively brought to a closed position where it defines a molding space in cooperation with the female mold member and to an open position where it is positioned separated away from the female mold member, and synthetic resin material introduction means, the synthetic resin material introduction means including an introduction member that defines a through hole and is positioned between the male mold member and the female mold member when the male mold is at the open position, wherein the synthetic resin introduction means includes lift means for moving the introduction member up and down, the through hole in the introduction member has a length in the up-and-down direction larger than the length in the up-and-down direction of the synthetic resin material held in the through hole, the introduction member is positioned over the female mold member facing thereto in a state where the synthetic resin material held in the through hole is protruding downward from the through hole, the introduction member moves down so that the lower end of the synthetic resin material is pushed onto the female mold member and, thereafter, the synthetic resin material is liberated from the introduction member.

Effect of the Invention

In this invention, the male mold member is used as the lower mold to shorten the distance the synthetic resin falls down. It is, therefore, made possible to correctly fall down the synthetic resin material onto the male mold member. Further, the center member of the female mold member that moves up and down can be disposed at the elevated position when the synthetic resin material is going to fall down from the synthetic resin material introduction means onto the center member in order to shorten the distance between the synthetic resin material introduction means and the upper surface of the center member and, therefore, to dispose the synthetic resin material at a correct position as a result of shortening the falling distance.

According to the compression-molding apparatus, the synthetic resin material is pre-molded in a manner that the synthetic resin material is forcibly and continuously urged by a gas stream jet from the gas stream jet means or by the push-down member even after the synthetic resin material falling down from the synthetic resin material introduction means has reached the male mold member or the upper surface of the center member of the female mold member. Namely, the synthetic resin material is pre-molded in a shape that can be easily compression-molded without deviation in position. Accordingly, the synthetic resin material maintains good directivity and evenly expands to the circumference thereof at the time of compression-molding.

According to the compression-molding apparatus and the compression-molding method of the present invention, provision is made of an upper metal mold and a lower metal mold for compression-molding a synthetic resin material, and means for introducing the synthetic resin material, wherein the introduction means moves down in a state where the synthetic resin material is protruding downward and liberates the synthetic resin material upon pushing it onto the lower metal mold. Therefore, the synthetic resin can be disposed at a correct position relative to the lower metal mold.

According to the compression-molding apparatus and the compression-molding method of the present invention, the synthetic resin material is pre-molded being continuously and forcibly urged by means which forcibly urges the synthetic resin material downward by a gas stream jet from the gas stream jet means or by the push-down member even after the synthetic resin material has reached the upper surface of the center member of the female mold member or the male mold member. Therefore, the synthetic resin material is pre-molded in a shape that can be easily compression-molded without deviation in position. Accordingly, the synthetic resin material maintains good directivity and evenly expands to the circumference thereof at the time of compression-molding.

Besides, the resin mass can be received from, and handed over, to the metal mold at high speeds in short periods of time.

BRIEF DESCRIPTION OF THE DRAWINGS

FIG. 20 illustrates a cutting/holding unit of a synthetic resin feeder in the molding system of FIG. 18, wherein A is a sectional view of a state where the holding members are closed (two-dot chain lines represent the open state), and B is a sectional view of a state where the first and second holding members are closed to hold the molten resin from the extrusion nozzle (line Y-Y in A).

Figure 1:
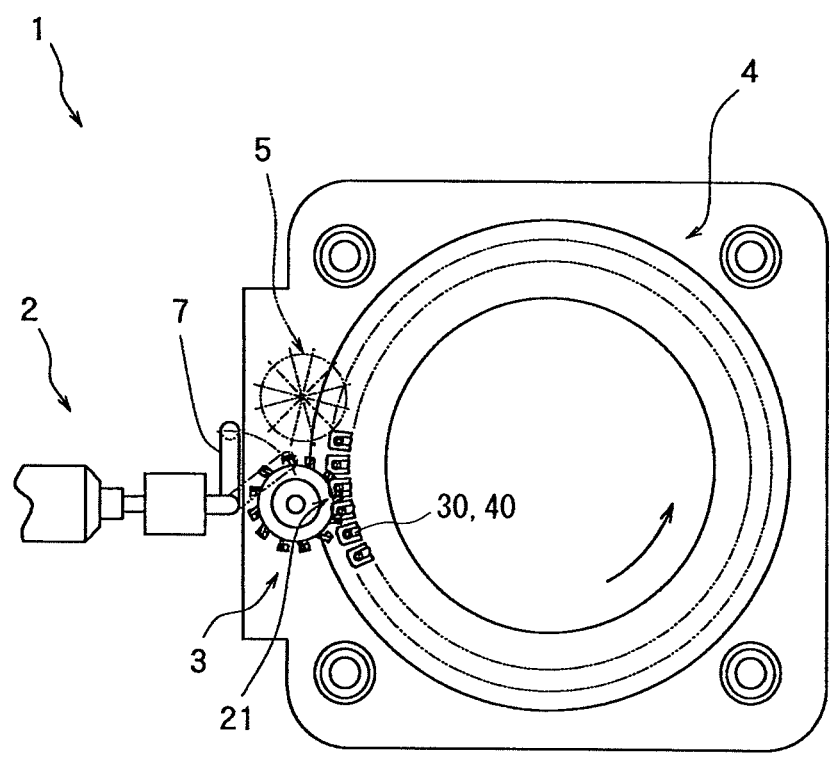
FIG. 1 is a plan view schematically illustrating a molding system 1 for putting into practice a preferred embodiment of a compression-molding method of the invention.

DESCRIPTION OF REFERENCE NUMERALS 1 molding system
2, 71 extruders
3, 72 synthetic resin feeders
4, 73 compression-molding apparatuses synthetic resin
14, 75 cutting/holding units
15, 81 first holding members
16, 82 second holding members
22, 30, 40 metal molds
23, 31, 41 female molds
23a recessed portion
23b placing surface
24, 32, 42 male molds
33a, 41a cavities
34 moving rod
35 male mold body
36 core mold
37 jet nozzle
51 lift rod

BEST MODE FOR CARRYING OUT THE INVENTION

The compression-molding apparatus according to a first embodiment of the invention will now be described with reference to the drawings.

Figure 2:
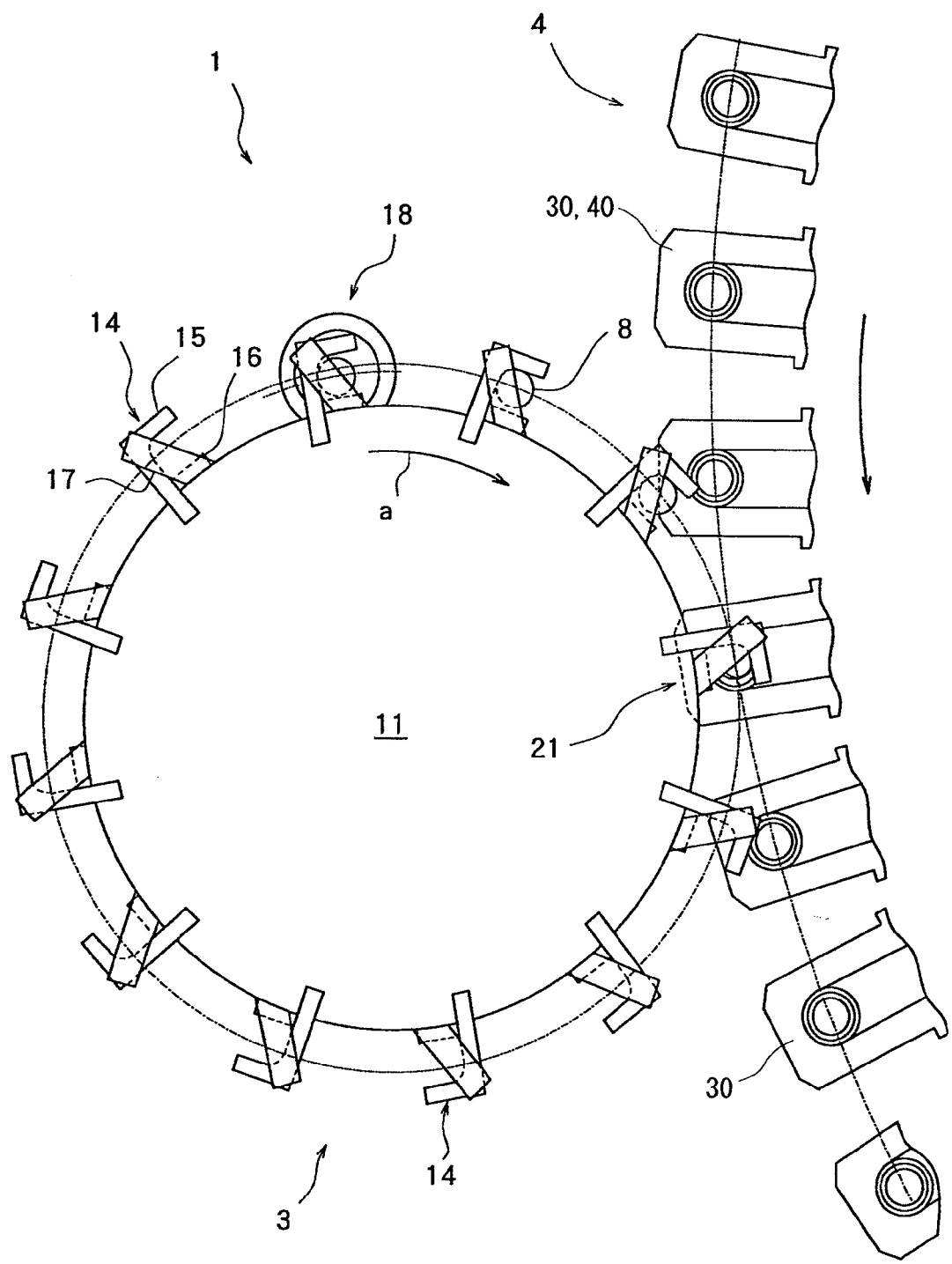
FIG. 2 is a plan view illustrating, on an enlarged scale, part of the molding system of FIG. 1.

FIG. 1 is a plan view schematically illustrating a molding system 1 for putting into practice a preferred embodiment of a compression-molding method of the invention, and FIG. 2 is a plan view illustrating, on an enlarged scale, part of the molding system of FIG. 1.

The molding system 1 is provided with an extruder 2, a synthetic resin feeder 3, a compression-molding apparatus 4 and a discharging device 5.

The extruder 2 has nearly a cylindrical outer shape, and works to heat, melt and knead a synthetic resin material such as PP, PET or the like to form a synthetic resin. The extruder 2 includes, at an end thereof, an extrusion nozzle 7 that is mounted to freely turn over preset angles between a non-acting position represented by a solid line and an acting position represented by a two-dot chain line. The extrusion nozzle 7 is forming, in the lower surface at an end thereof, a resin flow passage extending up to an extrusion opening 20 shown in A and B of FIG. 11. That is, the extruder 2 continuously feeds a molten synthetic resin 8 to the extrusion nozzle 7; i.e., the synthetic resin 8 fed from the extruder 2 is extruded through the extrusion opening 20. When the molding system 1 is acting, the extrusion nozzle 7 is disposed at the acting position in the stand-by state represented by chain double-dashed line in FIG. 1.

If described with reference to FIGS. 1 and 2, the synthetic resin feeder 3 includes a rotary disk 11 that rotates in a direction indicated by an arrow a. A plurality of cutting/holding units 14 are arranged along the circumferential edge of the rotary disk 11 maintaining an equal distance in the circumferential direction. Depending upon the rotation of the rotary disk 11, the cutting/holding units 14 are conveyed through a circular conveyer passage extending along the circumferential edge of the rotary disk 11, and are conveyed through a receiving zone 18 positioned just under the extrusion opening 20 of the extrusion nozzle 7 facing thereto and through a resin feed zone 21 positioned over a predetermined portion (molten resin-placing portion or recessed portion of a female mold or a male mold) of the compression-molding apparatus 4 facing thereto.

Figure 3:
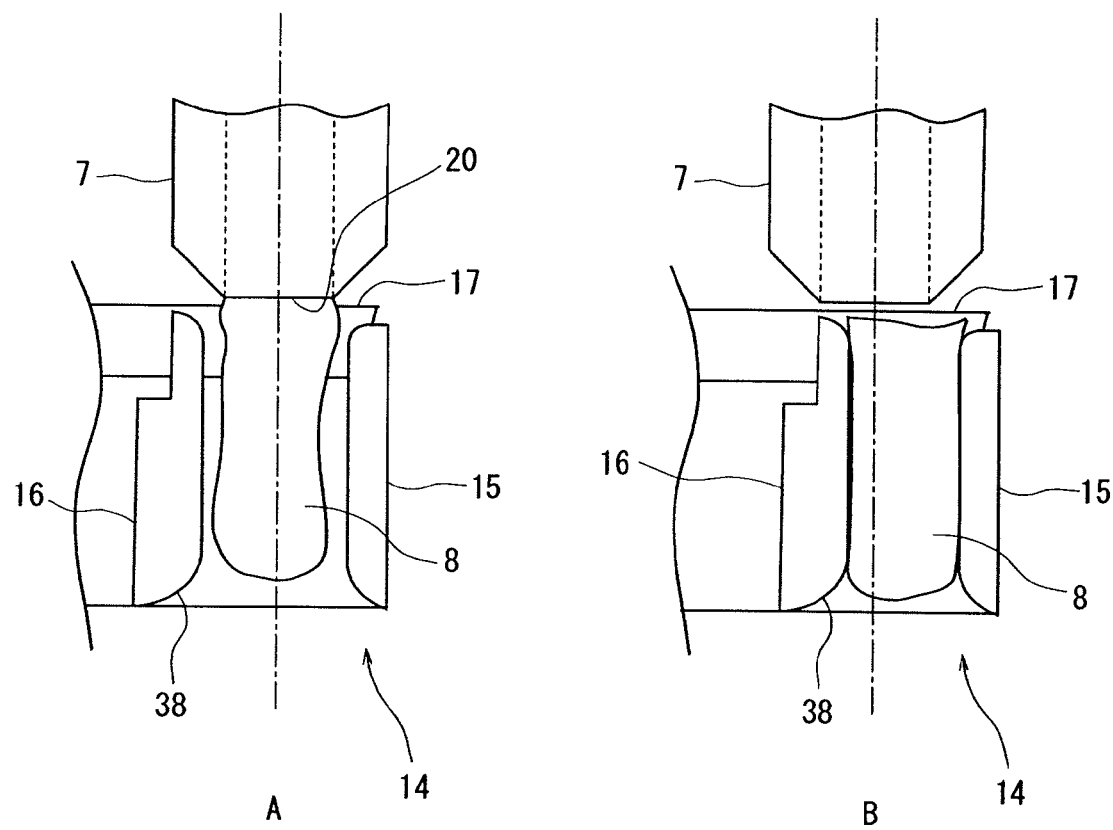
FIG. 3 illustrates a nozzle and a cutting/holding unit of a synthetic resin feeder in the molding system of FIG. 2, wherein A is a sectional view of a state where first and second holding members are opened, and B is a sectional view of a state where the first and second holding members are closed.

If further described with reference to FIG. 2 as well as FIG. 3, each cutting/holding unit 14 has a cutter 17, a first holding member 15 and a second holding member 16. The first holding member 15 and the second holding member 16, in cooperation together, define a receiving space having a front surface in the direction of motion as well as an upper surface and a lower surface that are opened. The second holding member 16 is allowed to suitably move between an open position where it is separated away from the first holding member 15 as shown in FIG. 3A and a holding position where it approaches the first holding member 15 as shown in FIG. 3B.

The cutter 17 is extending over the receiving space in a transverse direction. When the cutting/holding unit 14 passes through the receiving zone 18, the second holding member 16 is at the open position as shown in FIG. 3A, and the synthetic resin 8 of a molten state extruded from the extrusion opening 20 of the extrusion nozzle 7 is received in the receiving space.

The cutter 17 moves with its upper surface in contact with, or close, to the lower surface of the extrusion nozzle 7, and cuts the synthetic resin 8 extruded from the extrusion opening 20 in cooperation with the lower surface of the extrusion nozzle 7. At a suitable moment after the cutter 17 starts cutting the synthetic resin 8, the second holding member 16 moves to a holding position as shown in FIG. 3B whereby the synthetic resin 8 cut from the extrusion opening 20 is held between the first holding member 15 and the second holding member 16.

Figure 6:
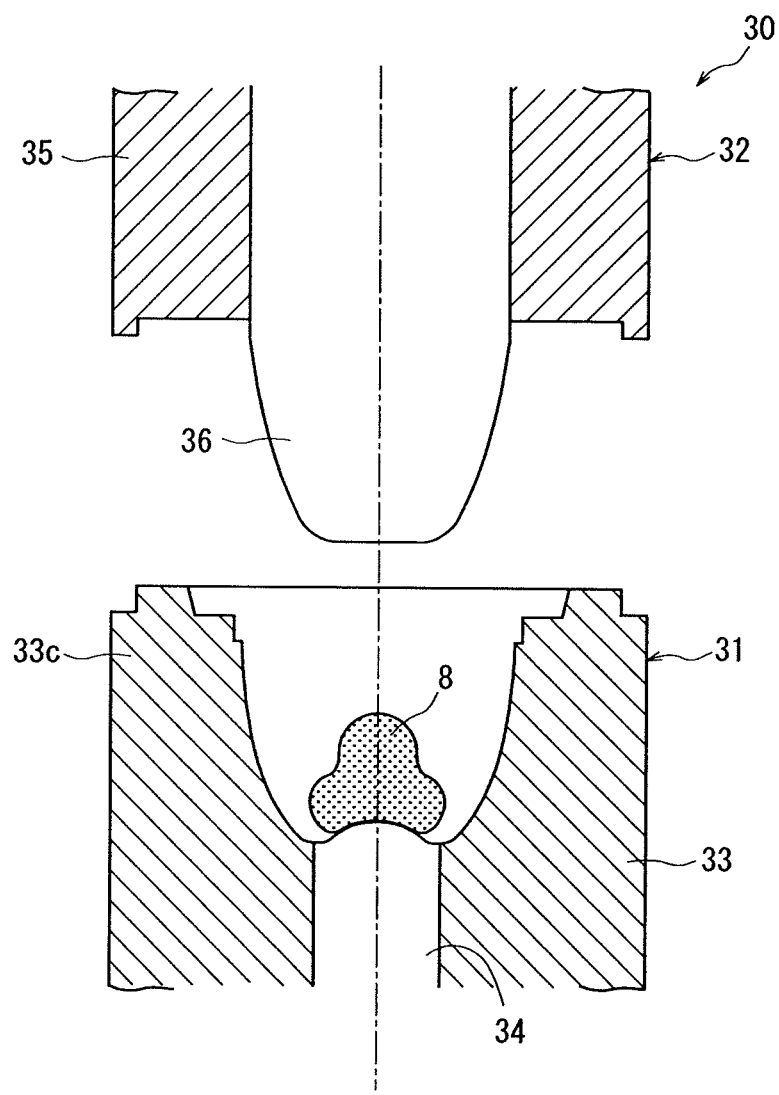
FIG. 6 is a sectional view of the compression-molding apparatus of FIG. 2, which is the metal mold according to second and third embodiments of the invention.

When the cutting/holding unit 14 passes through the resin feed zone 21, the second holding member 16 moves to an open position where the synthetic resin 8 starts liberated from being held by the first holding member 15 and the second holding member 16; i.e., the synthetic resin falls down onto a female mold 31 shown in FIG. 6 of the compression-molding machine located on the lower side.

Figure 4:
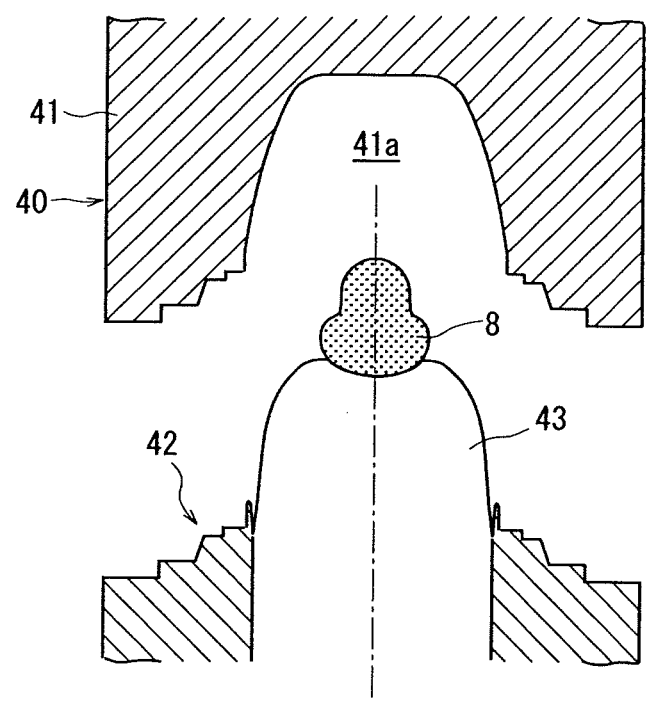
FIG. 4 is a sectional view of a metal mold according to first and fourth embodiments of the invention, which is the metal mold in the compression-molding apparatus of FIG. 2.

FIG. 4 illustrates a metal mold 40 according to the first embodiment of the invention, including a male mold 42 and a female mold 41. In this embodiment, the male mold 42 is arranged as the lower mold and the female mold 41 is arranged as the upper mold. The male mold 42 has a punch body 43 protruding upward at a central portion of the main body thereof. A recessed portion 43a is formed in an upper part of the punch body 43 so as to be dented downward in an arcuate shape, and the synthetic resin 8 is fed into the recessed portion 43a. The female mold 41 is forming a cavity 41a in the center thereof, an opening portion thereof being arranged facing downward.

The female mold 41 is provided with lift means that is not shown, and can be moved up and down relative to the male mold 42. If the female mold 41 moves down, the punch body 43 is inserted therein.

Figure 5:
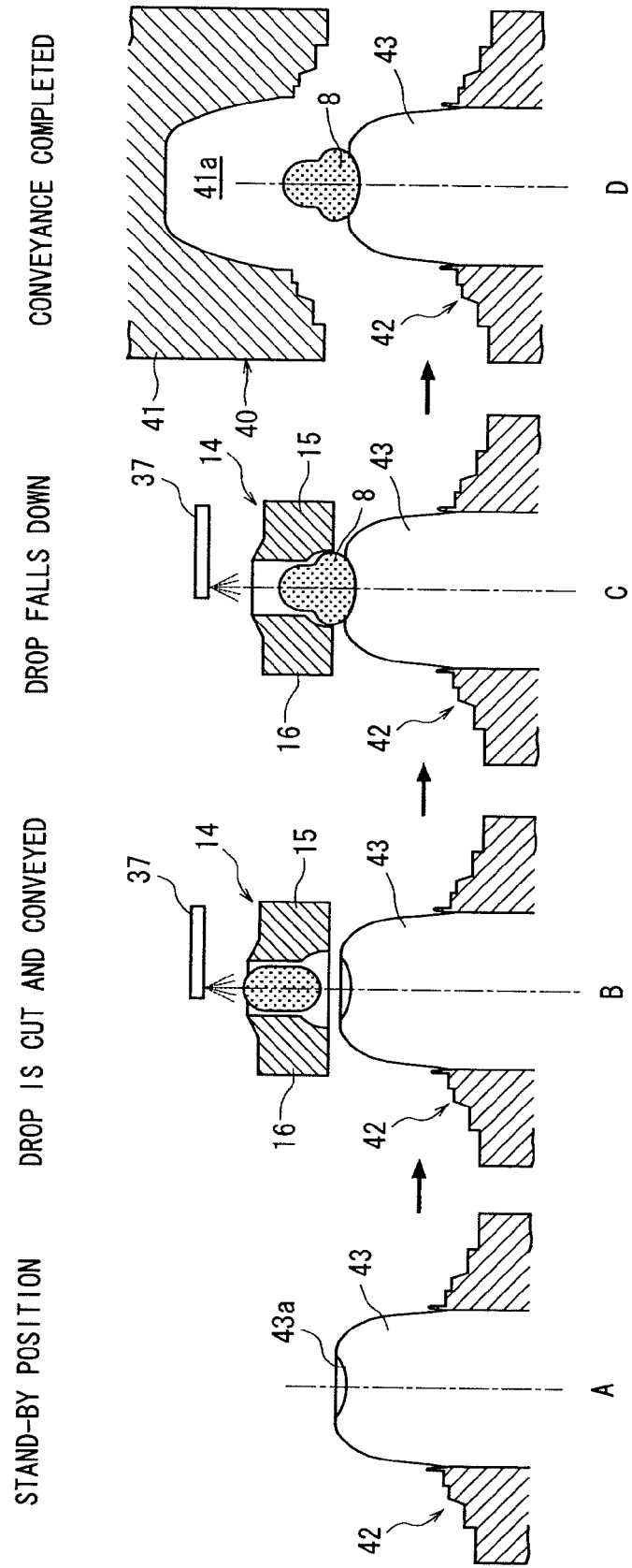
FIG. 5 illustrates a state where the shape of the synthetic resin is pre-molded with the compressed air according to the first embodiment of the invention (male mold is the lower mold), wherein A is a sectional view of a state where the male mold is standing by, B is a sectional view of a state where the synthetic resin is conveyed onto the male mold, C is a sectional view of a state where the synthetic resin has fallen onto the male mold and is pre-molded with the compressed air, and D is a sectional view of a state where the synthetic resin is conveyed onto the male mold.

Referring to FIGS. 5B and 5C, a gas jet nozzle 37 is disposed over a portion where the synthetic resin 8 is held by the first holding member 15 and the second holding member 16 of the cutting/holding unit 14, and gas feed means that is not shown is connected to the jet nozzle 37. The jet nozzle 37 jets a compressed gas such as of an inert gas or the air. A flaring portion 38 that is flaring downward is formed at lower portions of the first holding member 15 and the second holding member 16.

Next, described below is the operation of the compression-molding apparatus according to the first embodiment of the invention.

Being constituted as described above, the extruder 2 heats, melts and kneads the synthetic resin material such as polypropylene, polyethylene terephthalate or the like, and conveys the synthetic resin 8 to the extrusion nozzle 7. The synthetic resin 8 extruded from the extrusion opening 20 of the extrusion nozzle 7 is cut by the cutter 17 and is separated away from the extrusion opening 20. At the time of separating the synthetic resin 8, the first and second holding members 15 and 16 are closed to hold the synthetic resin 8. The molten resin 8 held by the cutting/holding unit 14 of the closed state is disposed over the punch body 43 of male mold 42 of the compression-molding apparatus 4. When their tracks are moved onto the resin feed zone 21 (see FIG. 2 and FIG. 5B) as above, the first and second holding members 15 and 16 of the cutting/holding unit 14 are opened, whereby the synthetic resin 8 falls down onto the recessed portion 43*a* of the punch body 43 from the cutting/holding unit 14 as shown in FIG. 5C. Here, since the male mold 42 is the lower mold, the distance which the synthetic resin 8 falls down is short, and the synthetic resin 8 can be disposed at a correct position in the recessed portion 43*a*.

At the same time, the compressed air is jetted from the jet nozzle 37 onto any portion of the synthetic resin 8; i.e., the compressed air adjusts the shape of the synthetic resin 8 and determines the position of the synthetic resin 8. The synthetic resin 8 is pre-molded, for example, in a direction in which the synthetic resin 8 is to be expanded at the time of being compressed (e.g., in a direction in which the molten resin expands less if there is any such a direction). Here, pre-molding the synthetic resin 8 is not interrupted since the flaring portion 38 has been formed in the lower portions of the first and second holding members 15 and 16.

Thus, the compressed air is jetted from the jet nozzle 37 to any portion of the synthetic resin 8. Therefore, the synthetic resin 8 is adjusted for its shape and is so held as to adhere to the recessed portion 43*a* of the punch body 43 preventing the deviation in position thereof.

After the synthetic resin 8 is pre-molded, the cutting/holding unit 14 separates away from the metal mold 40 as shown in FIG. 5D. At the time of molding, the synthetic resin 8 is premolded into a shape that can be easily compression-molded without deviation in position attaining good directivity for the compression-molding, and can be evenly expanded circumferentially.

The container (or lid, preform, etc.) that is compression-molded is taken out from the metal mold 40 after cooled.

In this embodiment, a layer (one kind) of molten resin is used as the synthetic resin 8. However, synthetic resins of two or more layers comprising a central core layer and shell layers around the core layer (see patent document 1) may be compression-molded by the same method as that of this embodiment. Here, however, the synthetic resins of two or more layers comprising, for example, an inner layer having excellent gas-barrier property wrapped in outer layers having excellent mechanical properties and hygienic property, arouses a serious problem in that the synthetic resins that deviate in the female mold make it difficult to evenly expand the core layer of synthetic resin. This embodiment, however, offers a favorable effect in compression-molding synthetic resins of a multi-layer structure, too.

Next, a second embodiment of the invention will be described. This embodiment is different from the above first embodiment with regard to the metal mold 30 only.

FIG. 6 illustrates the metal mold 30 according to the second embodiment. The metal mold 30 is constituted by a female mold 31 and a male mold 32, the female mold 31 having a female mold body 33 and a moving rod 34.

The female mold 31 includes the moving rod 34 of a cylindrical shape which is the center member and the female mold body 33 surrounding the moving rod 34. The female mold body 33 forms a recessed portion 33*c* that is opened upward. The moving rod 34 has a placing surface 34*a* which forms a cavity 33*a* shown in FIG. 6 and FIG. 7D in cooperation with the recessed portion 33*c* of the female mold body 33. The moving rod 34 moves up and down between a normal position (lowered position) shown in FIG. 7D and an elevated position shown in FIG. 7A that has moved upward above the normal position. An upper end of the moving rod 34 is forming a placing surface 34*a* of an upwardly protruding mild arcuate shape for placing the synthetic resin 8 thereon.

The male mold 32 includes a male mold body 35 and a core mold 36 arranged in the central portion of the male mold body 35. The male mold 32 can be slid up and down by drive means that is not shown.

Figure 7:
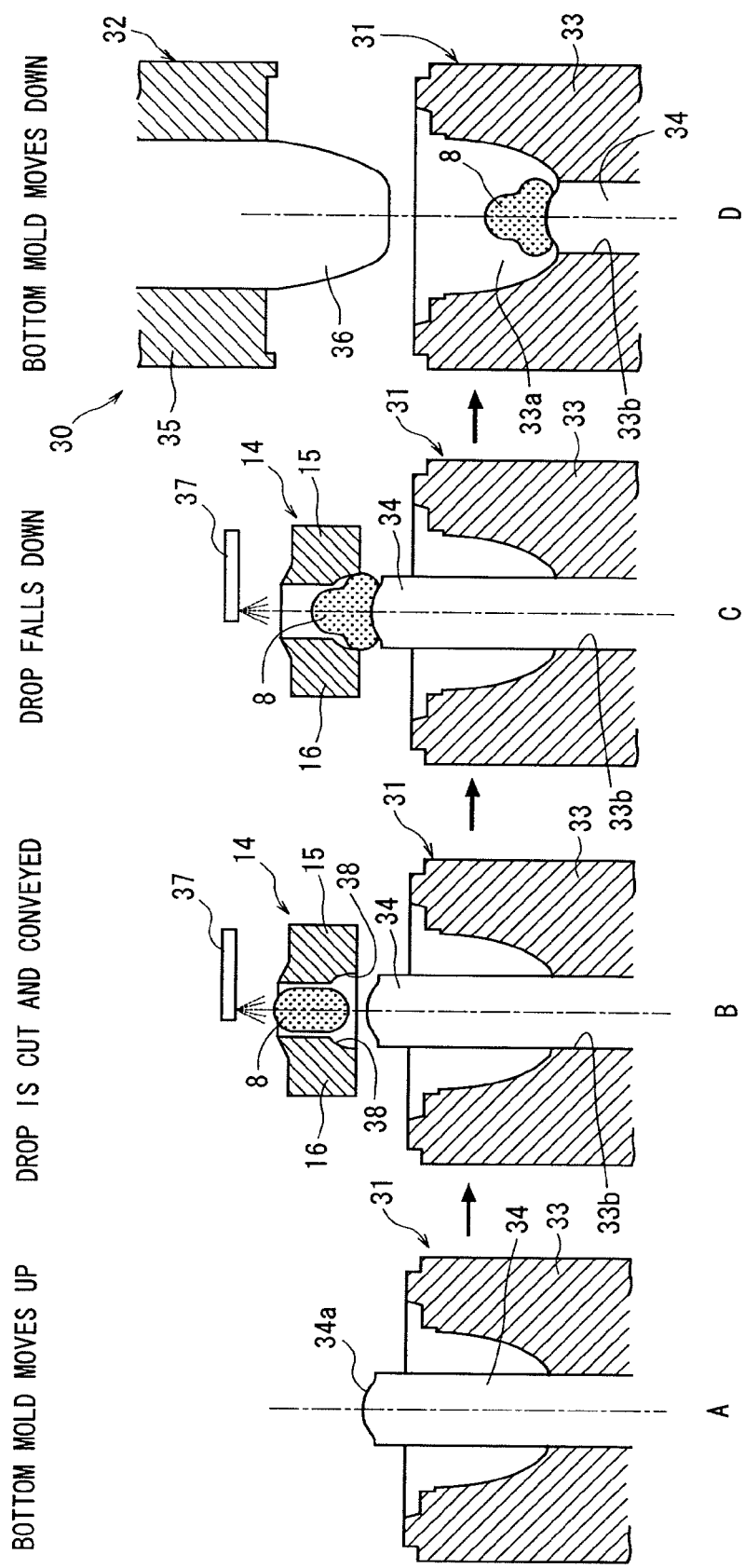
FIG. 7 illustrates a state where the shape of the synthetic resin is pre-molded with the compressed air according to the second embodiment of the invention, wherein A is a sectional view of a stand-by state where a moving rod has moved up, B is a sectional view of a state where the synthetic resin is conveyed onto the female mold, C is a sectional view of a state where the synthetic resin has fallen onto the moving rod and is pre-molded, and D is a sectional view of a state where the moving rod has moved down.

Referring to FIGS. 7B and 7C, the gas jet nozzle 37 is arranged over a portion for holding the synthetic resin 8 that is formed by the first holding member 15 and the second holding member 16 for holding the synthetic resin 8 of the cutting/holding unit 14, and gas feed means that is not shown is connected to the jet nozzle 37. The jet nozzle 37 jets a compressed gas such as of an inert gas or the air. A flaring portion 38 that is flaring downward is formed at lower portions of the first holding member 15 and the second holding member 16.

Next, described below is the operation of the compression-molding apparatus according to the second embodiment of the invention.

Being constituted as described above, the extruder 2 heats, melts and kneads the synthetic resin material such as polypropylene, polyethylene terephthalate or the like, and conveys the synthetic resin 8 to the extrusion nozzle 7. The synthetic resin 8 extruded from the extrusion opening 20 of the extrusion nozzle 7 is cut by the cutter 17 and is separated away from the extrusion opening 20. At the time of separating the synthetic resin 8, the first and second holding members 15 and 16 are closed to hold the synthetic resin 8. The molten resin 8 held by the cutting/holding unit 14 of the closed state is moved so as to be positioned over the female mold 31 of the compression-molding apparatus 4.

In the female mold 31 as shown in FIG. 7A, the moving rod 34 is disposed in a stand-by state at the elevated position. When the cutting/holding unit 14 has moved to the resin feed zone 21 (see FIG. 2) on the same track as that of the female mold 31 of the compression-molding apparatus 4, the cutting/holding unit 14 is positioned over the female mold 31 as shown in FIG. 7B. At this moment, the placing surface 34*a* of the moving rod 34 for placing the synthetic resin 8 is disposed at a position close to the synthetic resin 8. When their tracks have moved onto the resin feed zone 21, the first and second holding members 15 and 16 of the cutting/holding unit 14 are opened so that the synthetic resin 8 falls down onto the placing surface 34*a* of the moving rod 34 from the cutting/holding unit 14 as shown in FIG. 7C.

At this moment, the compressed air is jetted from the jet nozzle 37 onto any portion of the synthetic resin 8 to adjust the shape of the synthetic resin 8 and to determine the position of the synthetic resin 8. It is desired that the synthetic resin 8 is pre-molded, for example, in a direction in which the synthetic resin 8 is to be expanded at the time of being compressed (e.g., in a direction in which the molten resin expands less if there is any such a direction). Here, pre-molding the synthetic resin 8 is not interrupted since the flaring portion 38 has been formed in the lower portions of the first and second holding members 15 and 16.

Thereafter, as shown in FIG. 7D, the cutting/holding unit 14 separates away from over the track of the metal mold 30, and the moving rod 34 moves together with the synthetic resin 8 down to the lowered position. The synthetic resin 8 is adjusted for its shape and is so held as to adhere onto the placing surface 34a on the moving rod 34. Therefore, deviation in position of the synthetic resin 8 can be prevented. Further, since the distance which the synthetic resin 8 falls down is short, the synthetic resin 8 can be disposed at a correct position.

Next, the male mold 32 moves down, and is overlapped on the female mold 31 whereby the core mold 36 moves down together with the male mold 32 to compress the synthetic resin 8. Thus, the container is compression-molded. At the time of the compression-molding, the synthetic resin 8 is pre-molded into a shape that can be easily compression-molded without deviation in position attaining good directivity for the compression-molding, and can be evenly expanded circumferentially.

The container (or lid, preform, etc.) that is compression-molded is taken out from the metal mold 30 after cooled.

In this embodiment, a layer (one kind) of molten resin is used as the synthetic resin 8. However, synthetic resins of two or more layers comprising a central core layer and shell layers around the core layer (see patent document 1) may be compression-molded by the same method as that of this embodiment. Here, however, the synthetic resins of two or more layers comprising, for example, an inner layer having excellent gas-barrier property wrapped in outer layers having excellent mechanical properties and hygienic property, arouses a serious problem in that the synthetic resins that deviate in the female mold make it difficult to evenly expand the core layer of synthetic resin. This embodiment, however, offers a favorable effect in compression-molding synthetic resins of a multi-layer structure, too. Though this is not described below again, the same also holds in the third to tenth embodiments described below.

Next, the second embodiment of the invention will be described with reference to FIGS. 8 and 9. The same portions as those of the second embodiment are described by attaching the same reference numerals.

This embodiment uses the same metal mold as the metal mold 30 (see FIG. 6) described in the above second embodiment, but what makes a difference is that the cutting/holding unit 14 is not provided with the jet nozzle 37 and the metal mold is provided with a lift rod 51.

Figure 8:
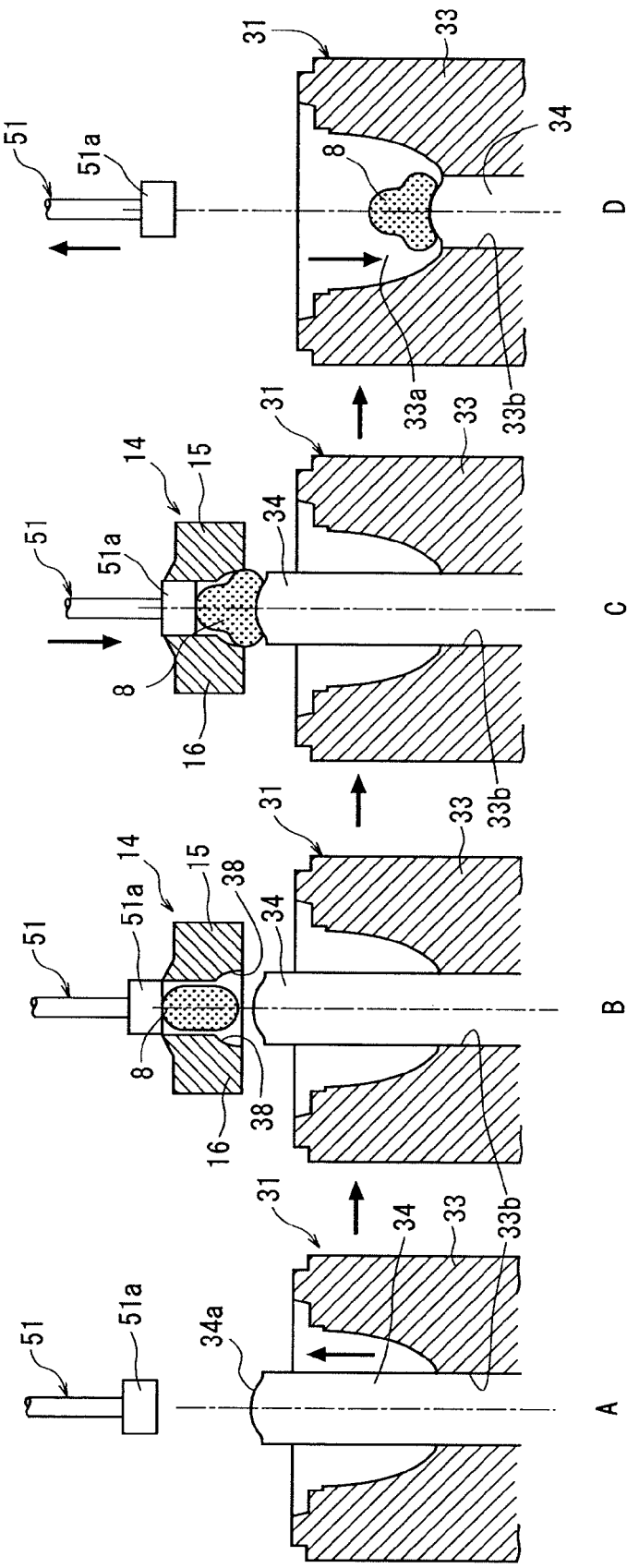
FIG. 8 illustrates a state where the shape of the synthetic resin is pre-molded with a pusher according to the third embodiment of the invention, wherein A is a sectional view of a stand-by state where the moving rod has moved up, B is a sectional view of a state where the synthetic resin is conveyed onto the female mold, C is a sectional view of a state where the synthetic resin has fallen onto the moving rod and is pre-molded, and D is a sectional view of a state where the moving rod has moved down.

Referring to FIG. 8, the female mold 31 includes the female mold body 33 and the moving rod 34. The female mold body 33 forms a cavity 33a on the upper side in the central portion thereof (see FIG. 8D) and a slide hole 33b communicated with the lower port of the cavity 33a. The moving rod 34 of a cylindrical shape is allowed to move up and down in the slide hole 33b being driven by drive means, and can be brought to an upper position shown in FIG. 8A and to a lower position shown in FIG. 8D. The upper end of the moving rod 34 is forming the placing surface 34a formed in an upwardly protruding mild arcuate shape for placing the synthetic resin 8 thereon.

The lift rod 51 having an axis in the up-and-down direction is disposed over the female mold 31, and a pusher 51a is attached to an end (lower end) of the lift rod 51 to push the synthetic resin 8 toward the female mold. The lift rod 51 can be moved up and down, and is so disposed that the pusher 51a faces the placing surface 34a of the moving rod 34. In this embodiment, the lift rod 51 and the moving rod 34 have their axes in agreement on a straight line. Referring to FIG. 8B, when the cutting/holding unit 14 and the female mold 31 have their tracks brought into agreement with each other, the cutting/holding unit 14 can be disposed between the lift rod 51 and the female mold 31. The pusher 51a of the lift rod 51 is so constituted as to pass through the holding portion of the cutting/holding unit 14 for holding the synthetic resin 8.

Figure 9:
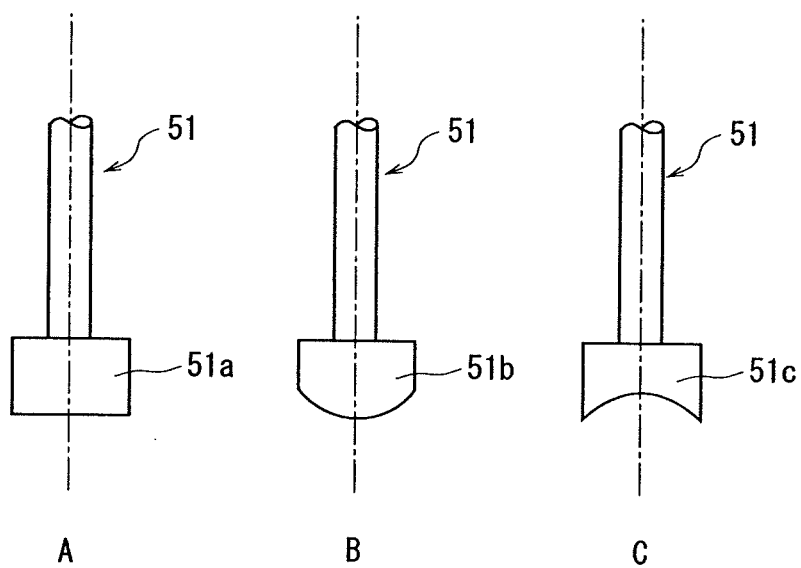
FIG. 9 illustrates the shape of the pusher of FIG. 8, wherein A is a sectional view of the pusher having an end of the shape of a flat surface, B is a sectional view of the pusher having an end of the shape of a protruded sphere, and C is a sectional view of the pusher having an end of the shape of a recessed sphere.

FIG. 9 illustrates the shapes of the pusher 51, wherein the pusher 51a shown in FIG. 9A has a flat surface at the end thereof, the pusher 51b shown in FIG. 9B has a protruded spherical shape at the end thereof, and the pusher 51c shown in FIG. 9C has a recessed spherical shape at the end thereof, suitably differing depending upon the shape of the molded article. Here, the lift rod 51 may be attached to the cutting/holding unit 14.

In the thus constituted female mold 31 as shown in FIG. 8A, the lift rod 51 is disposed at the elevated position with the moving rod 34 standing by at its elevated position. When the cutting/holding unit 14 is positioned over the female mold 31 as shown in FIG. 8B, the placing surface 34a of the moving rod 34 for placing the synthetic resin 8 is disposed at a position close to the synthetic resin 8. Then, the first and second holding members 15 and 16 are opened permitting the synthetic resin 8 to fall down onto the placing surface 34a of the moving rod 34. Thereafter, the lift rod 51 moves down, enters into the first and second holding members 15 and 16, and pre-molds the synthetic resin 8 depending upon the shape of the end surface of the pusher 51a. For example, the synthetic resin 8 is pre-molded in a direction in which the synthetic resin 8 is to be expanded at the time of compression-molding (in a direction in which the molten resin expands less if there is any such a direction). Here, pre-molding the synthetic resin 8 is not interrupted since the flaring portion 38 has been formed in the lower portions of the first and second holding members 15 and 16.

Thereafter, the lift rod 51 returns back to the elevated position, the cutting/holding unit 14 separates away from above the female mold 31 as shown in FIG. 8D, and the moving rod 34 moves together with the synthetic resin 8 down to the lowered position. The synthetic resin 8 is adjusted for its shape and is so held as to adhere onto the placing surface 34a on the moving rod 34. Therefore, deviation in position of the synthetic resin 8 can be prevented. Further, since the distance which the synthetic resin 8 falls down is short, the synthetic resin 8 can be disposed at a correct position.

Next, the male mold 32 moves down and is overlapped on the female mold 31 whereby the core mold 36 moves down to compress the synthetic resin 8. Thus, the container is molded. At the time of the molding, the synthetic resin 8 is pre-molded into a shape that can be easily compression-molded without deviation in position attaining good directivity for the compression-molding, and can be evenly expanded circumferentially.

The container (or lid, preform, etc.) that is compression-molded is taken out from the metal mold 30 after cooled.

Next, a fourth embodiment of the invention will be described.

In this embodiment, the lift rod 51 of the above third embodiment is used instead of the jet nozzle 37 of the above first embodiment.

Figure 10:
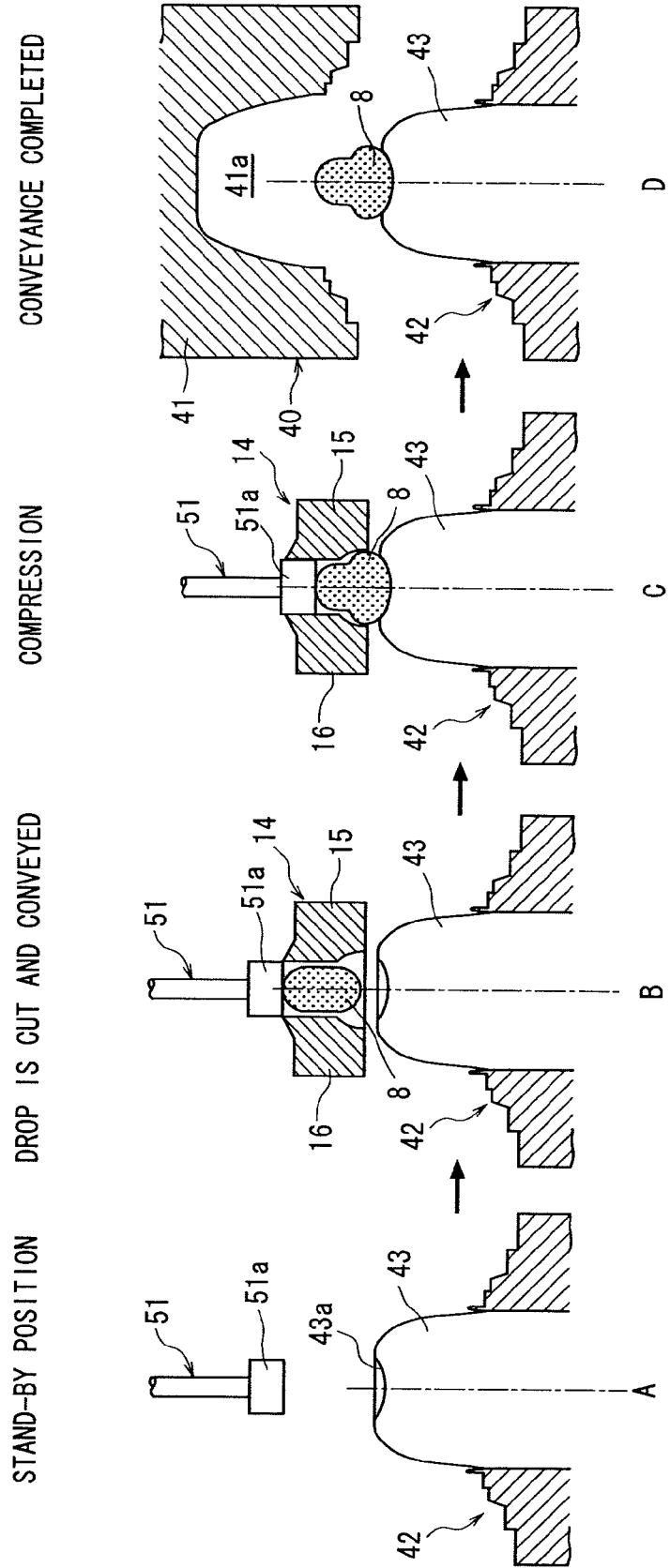
FIG. 10 illustrates a state where the shape of the synthetic resin is pre-molded with the pusher according to the fourth embodiment of the invention (male mold is the lower mold), wherein A is a sectional view of a state where the male mold is standing by, B is a sectional view of a state where the synthetic resin is conveyed onto the male mold, C is a sectional view of a state where the synthetic resin has fallen onto the male mold and is pre-molded with the pusher, and D is a sectional view of a state where the synthetic resin is conveyed onto the male mold.

Referring to FIG. 10D, the metal mold 40 has the male mold 42 arranged as the lower mold and the female mold 41 arranged as the upper mold. The male mold 42 has, in the center portion thereof, a punch body 43 protruding upward, and a recessed portion 43a is formed in the upper part of the punch body 43 dented downward. The female mold 41 is forming a cavity 41a in the center thereof.

The lift rod 51 having an axis in the up-and-down direction is disposed over the male mold 42, and the pusher 51a is attached to the end (lower end) of the lift rod 51 to push the synthetic resin 8 toward the male mold. The lift rod 51 can be moved up and down, and is so disposed that the pusher 51a faces the recessed portion 43a of the punch body 43. Referring to FIG. 10B, when the cutting/holding unit 14 and the male mold 42 have their tracks brought into agreement with each other, the cutting/holding unit 14 can be disposed between the lift rod 51 and the male mold 42. The pusher 51a of the lift rod 51 is so constituted as to pass through the holding portion of the cutting/holding unit 14 for holding the synthetic resin 8.

In this constitution as shown in FIG. 10B, when the cutting/holding unit 14 is conveyed to over the punch body 43 of the male mold 42 in the stand-by state, the synthetic resin is disposed at a position close to the recessed portion 43a of the punch body 43. When their tracks have moved onto the resin feed zone 21 (see FIG. 2), the first and second holding members 15 and 16 of the cutting/holding unit 14 are opened permitting the synthetic resin 8 to fall down onto the recessed portion 43a of the punch body 43 as shown in FIG. 5C. Since the distance which the synthetic resin 8 falls down is short, the synthetic resin 8 can be disposed at a correct position.

Next, referring to FIG. 10C, the lift rod 51 moves down, enters into the first and second holding members 15 and 16, and pushes the synthetic resin 8 onto the recessed portion 43a of the punch body 43. The synthetic resin 8 can be pre-molded depending upon the shape of the end surface of the pusher 51a of the lift rod 51. Here, pre-molding the synthetic resin 8 is not interrupted since the flaring portion 38 has been formed in the lower portions of the first and second holding members 15 and 16.

Thereafter, the lift rod 51 returns back to the elevated position, and the cutting/holding unit 14 and the lift rod 51 separate away from above the track of the male mold 32 as shown in FIG. 8D. Thus, the synthetic resin 8 is adjusted for its shape and is so held as to adhere onto the recessed portion 43a of the punch body 43. Therefore, deviation in position of the synthetic resin 8 can be prevented. Further, since the distance which the synthetic resin 8 falls down is short, the synthetic resin 8 can be disposed at a correct position.

Next, the female mold 31 moves down and is overlapped on the male mold 32 whereby the synthetic resin 8 is compressed to mold a container. At the time of the molding, the synthetic resin 8 is pre-molded into a shape that can be easily compression-molded without deviation in position attaining good directivity for the compression-molding, and can be evenly expanded circumferentially.

The container (or lid, preform, etc.) that is compression-molded is taken out from the metal mold 30 after cooled.

Next, a compression-molding apparatus according to a fifth embodiment of the invention will be described with reference to the drawings.

In the fifth embodiment through up to the tenth embodiment, the cutting/holding unit 14 has a shape different from that of the above first to fourth embodiments but is described by attaching the same reference numeral for convenience.

If further described with reference to FIG. 11, each of the cutting/holding units 14 has the cutter 17, first holding member 15 and second holding member 16. The first holding member 15 and the second holding member 16 work in cooperation to define a receiving space having a front surface in the moving direction, an upper surface and a lower surface, which are opening. The second holding member 16 is allowed to suitably move between an open position where it separates away from the first holding member 15 as shown in FIG. 11A and a holding position where it approaches the first holding member 15 as shown in FIG. 11B.

The holding members 15 and 16 have a length in the up-and-down direction which is shorter than the length of a unit (bullet) of the synthetic resin 8 that is extruded downward from the extrusion nozzle 7 and is cut by the cutter 17. That is, while the holding members 15 and 16 are holding the synthetic resin 8, the lower end of the synthetic resin 8 is allowed to protrude beyond the lower end of the holding members 15 and 16 (see FIG. 22A which is a plan view of the holding members 15 and 16).

The cutter 17 for cutting the synthetic resin 8 is extending sideways above the receiving space of the holding members 15 and 16. Just before the cutting/holding unit 14 passes through the receiving zone 18, the second holding member 16 is at the open position as shown in FIG. 11A, and the synthetic resin 8 in the molten state extruded from the extrusion opening 20 of the extrusion nozzle 7 is received by the receiving space.

The cutter 17 moves with its upper surface in contact with, or close to, the lower surface of the extrusion nozzle 7, and cuts the synthetic resin 8 extruded from the extrusion opening 20 in cooperation with the lower surface of the extrusion nozzle 7. At a suitable moment after the cutter 17 starts cutting the synthetic resin 8, the second holding member 16 moves to the holding position as shown in FIG. 11B. Thus, the synthetic resin 8 cut from the extrusion opening 20 is held between the first holding member 15 and the second holding member 16.

When the cutting/holding unit 14 passes through the resin feed zone 21 shown in FIG. 2, the second holding member 16 moves to the open position, and the synthetic resin 8 is liberated from being held by the first holding member 15 and the second holding member 16 working in cooperation together.

Figure 12:
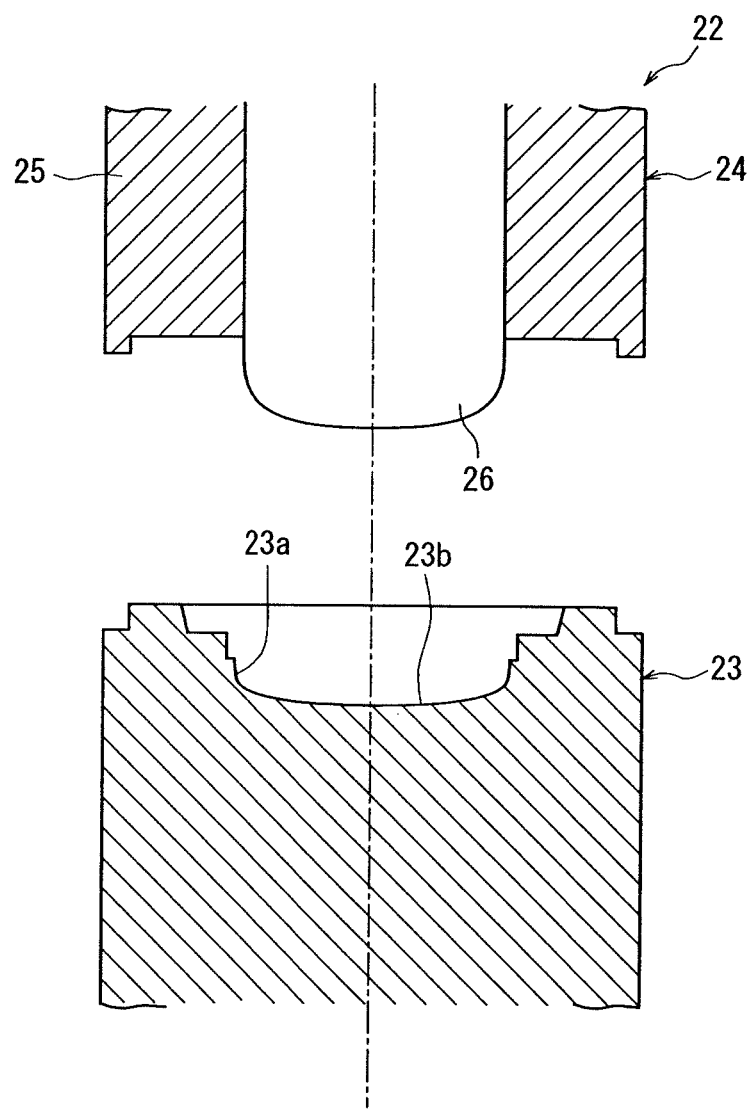
FIG. 12 is a sectional view of the metal mold in the compression-molding apparatus of the fifth embodiment of the invention, which is the metal mold according to the fifth embodiment of the invention.

FIG. 12 illustrates a metal mold 22 according to the fifth embodiment of the invention. The metal mold 22 is constituted by a female mold 23 and a male mold 24, the female mold 23 forming, in the central portion thereof, a recessed portion 23a that is opened upward, and the recessed portion 23a forming, in the bottom portion thereof, a placing surface 23b for placing the synthetic resin 8.

The male mold 24 includes a male mold body 25 and a core mold 26 disposed in the central hole of the male mold body 25. The male mold 24 can be moved up and down by drive means that is not shown.

Next, described below is the operation of the compression-molding apparatus according to the fifth embodiment of the invention.

Being constituted as described above, the extruder 2 shown in FIG. 1 heats, melts and kneads the synthetic resin material such as polypropylene, polyethylene terephthalate or the like, and conveys the synthetic resin 8 to the extrusion nozzle 7. As shown in FIGS. 11A and 11B, the synthetic resin 8 extruded from the extrusion opening 20 of the extrusion nozzle 7 is cut by the cutter 17 and is separated away from the extrusion opening 20. At the time of separating the synthetic resin 8, the first and second holding members 15 and 16 are closed to hold the synthetic resin 8. The holding members 15 and 16 so hold the synthetic resin 8 that the lower end thereof protrudes downward beyond the holding members 15 and 16. The synthetic resin 8 held by the cutting/holding unit 14 is moved to the female mold 23 of the compression-molding apparatus 4.

When the cutting/holding unit 14 has moved to the resin feed zone 21 (see FIG. 2) on the same track as that of the female mold 23 of the compression-molding apparatus 4, the holding members 15 and 16 work to position the synthetic resin 8 over the female mold 23. At this moment as shown in FIG. 11C, the cutting/holding unit 14 causes the holding members 15 and 16 to move down toward the female mold 23 by using lift means that is not shown. The holding members 15 and 16 work to bring the lower end of the synthetic resin 8 into contact with a predetermined position on the placing surface 23b of the female mold 23 on which the synthetic resin 8 is to be placed, and to position the synthetic resin 8 on the placing surface 23b so as to push or crush the lower end of the synthetic resin 8 even after the synthetic resin 8 has come in contact. Therefore, the lower end of the synthetic resin 8 must have been protruded beyond the lower ends of the holding members 15 and 16 to a sufficient degree so that the holding members 15 and 16 will not come in contact with the female mold 23.

After the synthetic resin 8 is placed on the placing surface 23b, the cutting/holding unit 14 moves up with the first and second holding members 15 and 16 of the cutting/holding unit 14 in the open state. Thereafter, the cutting/holding unit 14 separates away from over the track of the metal mold 22. At this moment, the compressed air is jetted from the jet nozzle 37 (see FIG. 14C) onto any portion of the synthetic resin 8, or the synthetic resin 8 may be pre-molded depending upon the shape of the end surface of the pusher 51a (see FIG. 16C) to adjust the shape of the synthetic resin 8 as described in the embodiments below. In this case, pre-molding the synthetic resin 8 is not interrupted since the flaring portion 38 has been formed in the lower portions of the first and second holding members 15 and 16.

The male mold 24 shown in FIG. 12 moves down and is overlapped on the female mold 23 whereby the core mold 36 moves down together with the male mold 24 to compress the synthetic resin 8 to thereby compression-mold a container. At the time of the compression-molding, the synthetic resin 8 is pre-molded into a shape that can be easily compression-molded without deviation in position attaining good directivity of the synthetic resin 8 for the compression-molding, and can be evenly expanded circumferentially. The preform (container, lid, etc.) that is compression-molded is taken out from the metal mold 22 after cooled.

In this embodiment, a layer (one kind) of molten resin is used as the synthetic resin 8. However, synthetic resins of two or more layers comprising a central core layer and shell layers around the core layer (see patent document 1) may be compression-molded by the same method as that of this embodiment. Here, however, the synthetic resins of two or more layers comprising, for example, an inner layer having excellent gas-barrier property wrapped in outer layers having excellent mechanical properties and hygienic property, arouse a serious problem in that the synthetic resins that deviate in the female mold make it difficult to evenly expand the core layer of synthetic resin. This embodiment, however, offers a favorable effect in compression-molding synthetic resins of a multi-layer structure, too. The same also holds in other embodiments.

Figure 13:
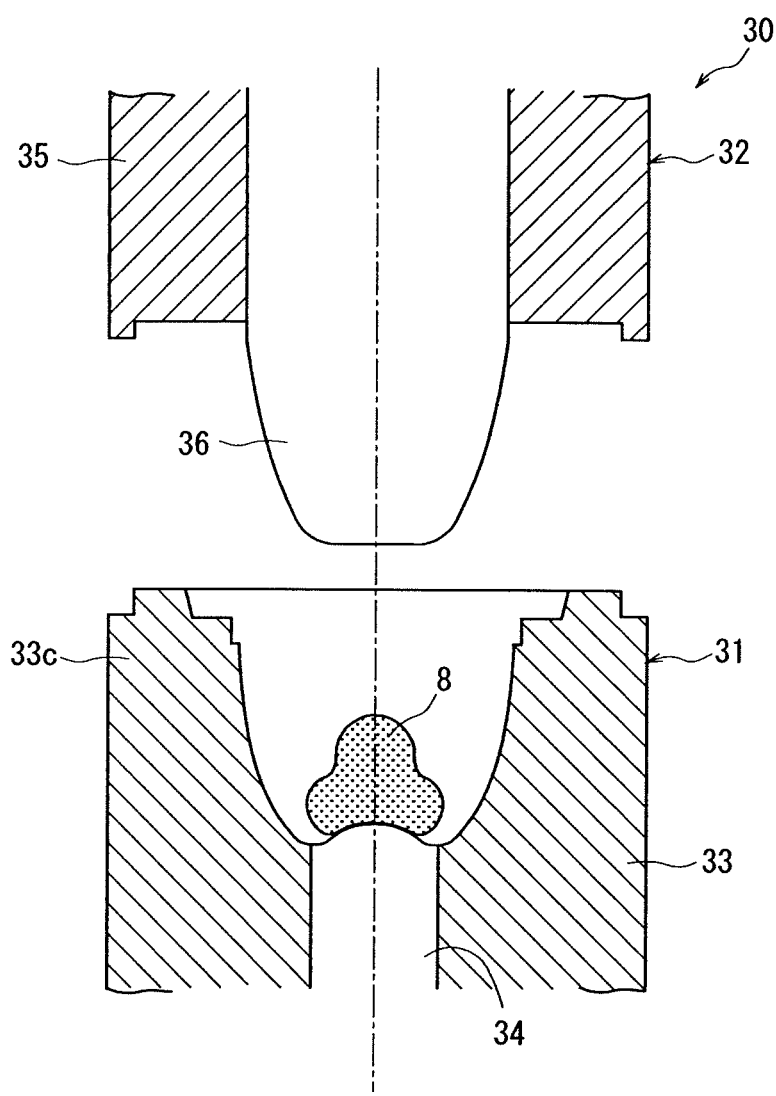
FIG. 13 is a sectional view of the metal mold in the compression-molding apparatus of a sixth embodiment of the invention, which is the metal mold according to the second and eighth embodiments of the invention.

FIG. 13 shows a metal mold 30 according to a sixth embodiment of the invention which is substantially the same as the metal mold of the above second embodiment. The metal mold 30 is constituted by a female mold 31 and a male mold 32, the female mold 31 having a female mold body 33 and a moving rod 34.

The female mold 31 includes a moving rod 34 of a cylindrical shape which is the center member and the female mold body 33 surrounding the moving rod 34. The female mold body 33 forms a recessed portion 33c that is opened upward. The moving rod 34 has a placing surface 34a which forms a cavity 33a shown in FIG. 14D in cooperation with the recessed portion 33c of the female mold body 33. The moving rod 34 moves up and down between a normal position (lowered position) shown in FIG. 14D and an elevated position shown in FIG. 14A that has moved upward above the normal position. An upper end of the moving rod 34 is forming a placing surface 34a of an upwardly protruding mild arcuate shape for placing the synthetic resin 8 thereon.

The male mold 32 includes a male mold body 35 and a core mold 36 arranged in the central portion of the male mold body 35. The male mold 32 can be moved up and down by drive means that is not shown.

Figure 14:
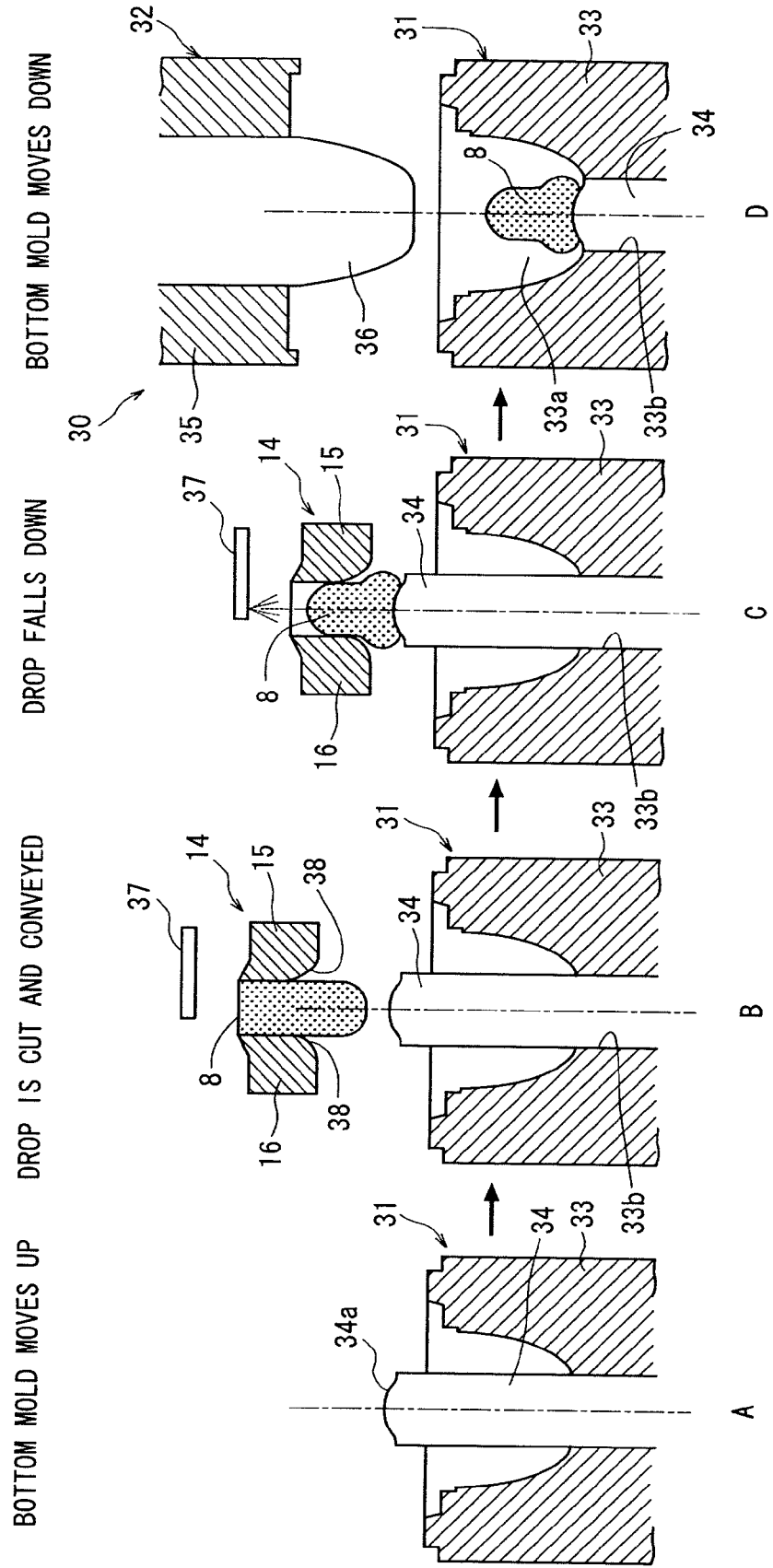
FIG. 14 illustrates a state where the shape of the synthetic resin is pre-molded with the compressed air according to the sixth embodiment of the invention, wherein A is a sectional view of a stand-by state where the moving rod has moved, B is a sectional view of a state where the synthetic resin is conveyed onto the female mold, C is a sectional view of a state where the synthetic resin is placed on the moving rod and is pre-molded, and D is a sectional view of a state where the moving rod has moved down.

Referring to FIGS. 14B and 14C, the first holding member 15 and the second holding member 16 of the cutting/holding unit 14 for holding the synthetic resin 8 are constituted in the same manner as those of the above fifth embodiment. The holding members 15 and 16 have a length in the up-and-down direction which is shorter than the length of a unit (bullet) of the synthetic resin 8 that is extruded from the extrusion nozzle 7 and is cut by the cutter 17. While the holding members 15 and 16 are holding the synthetic resin 8, the lower end of the synthetic resin 8 is allowed to protrude beyond the lower ends of the holding members 15 and 16.

A gas jet nozzle 37 is arranged over a portion for holding the synthetic resin 8 that is formed by the first holding member 15 and the second holding member 16, and gas feed means that is not shown is connected to the jet nozzle 37. The jet nozzle 37 jets a compressed gas such as of an inert gas or the air. A flaring portion 38 that is flaring downward is formed at lower portions of the first holding member 15 and the second holding member 16.

Next, described below is the operation of the compression-molding apparatus according to the sixth embodiment of the invention.

Being constituted as described above, the extruder 2 heats, melts and kneads the synthetic resin material such as polypropylene, polyethylene terephthalate or the like, and conveys the synthetic resin 8 to the extrusion nozzle 7. The synthetic resin 8 extruded from the extrusion opening 20 of the extrusion nozzle 7 is cut by the cutter 17 and is separated away from the extrusion opening 20. At the time of separating the synthetic resin 8, the first and second holding members 15 and 16 are closed to hold the synthetic resin 8. Here, as shown in FIG. 11B, the holding members 15 and 16 so hold the synthetic resin 8 that the lower end thereof protrudes downward beyond the holding members 15 and 16. The molten resin 8 held by the cutting/holding unit 14 of the closed state is moved so as to be positioned over the female mold 31 of the compression-molding apparatus 4.

In the female mold 31 as shown in FIG. 14A, the moving rod 34 is disposed in a stand-by state at the elevated position. When the cutting/holding unit 14 has moved to the resin feed zone 21 (see FIG. 2) on the same track as that of the female mold 31 of the compression-molding apparatus 4, the cutting/holding unit 14 is positioned over the moving rod 34 of the female mold 31 as shown in FIG. 14B. At this moment, the placing surface 34a of the moving rod 34 for placing the synthetic resin 8 is disposed at a position close to the synthetic resin 8. When their tracks have moved onto the resin feed zone 21, the first and second holding members 15 and 16 of the cutting/holding unit 14 are moved down by lift means that is not shown; i.e., the support members 15 and 16 move down toward the female mold 31. The holding members 15 and 16 work to bring the lower end of the synthetic resin 8 into contact with a predetermined position on the placing surface 34a of the moving rod 34 of the female mold 31 on which the synthetic resin 8 is to be placed, and to position the synthetic resin on the placing surface 34a so as to press or crush the synthetic resin 8 onto the lower end side even after having come in contact. After the synthetic resin 8 is positioned, the holding members 15 and 16 are opened to release the synthetic resin 8 and, thereafter, the holding members 15 and 16 are moved up. Thereafter, the cutting/holding unit 14 separates away from over the track of the metal mold 22.

At this moment, the compressed air is jetted from the jet nozzle 37 onto any portion of the synthetic resin 8 to adjust the shape of the synthetic resin 8 and to determine the position of the synthetic resin 8. It is desired that the synthetic resin 8 is pre-molded, for example, in a direction in which the synthetic resin 8 is to be expanded at the time of being compressed (e.g., in a direction in which the molten resin expands less if there is any such a direction). Here, pre-molding the synthetic resin 8 is not interrupted since the flaring portion 38 has been formed in the lower portions of the first and second holding members 15 and 16.

Thereafter, as shown in FIG. 14D, the cutting/holding unit 14 separates away from over the track of the metal mold 30, and the moving rod 34 moves together with the synthetic resin 8 down to the lowered position. The synthetic resin 8 is adjusted for its shape and is so held as to adhere onto the placing surface 34a of the moving rod 34. Therefore, deviation in position of the synthetic resin 8 can be prevented.

Next, the male mold 32 moves down, and is overlapped on the female mold 31 whereby the core mold 36 moves down together with the male mold 32 to compress the synthetic resin 8. Thus, the preform (container, lid, etc.) is compression-molded. At the time of the compression-molding, the synthetic resin 8 is pre-molded into a shape that can be easily compression-molded without deviation in position attaining good directivity for the compression-molding, and can be evenly expanded circumferentially.

The preform or the like that is compression-molded is taken out from the metal mold 30 after cooled.

The above fifth embodiment is capable of forming a container having a deep bottom if, for example, the holding members 15 and 16 are of such a mechanism that enters into the recessed portion 23b of the female mold 23 but is not suited for forming a container having a deep bottom if the holding members 15 and 16 interfere with the recessed portion 23b. In the sixth embodiment, the moving rod 34 moves up to meet the synthetic resin 8 without causing interference offering an effect that the embodiment can be applied unconditionally to the containers having a deep bottom.

Next, a seventh embodiment of the invention will be described.

This embodiment is different from the above fifth embodiment with regard to the metal mold only. The metal mold is substantially the same as the metal mold of the first embodiment.

Figure 15:
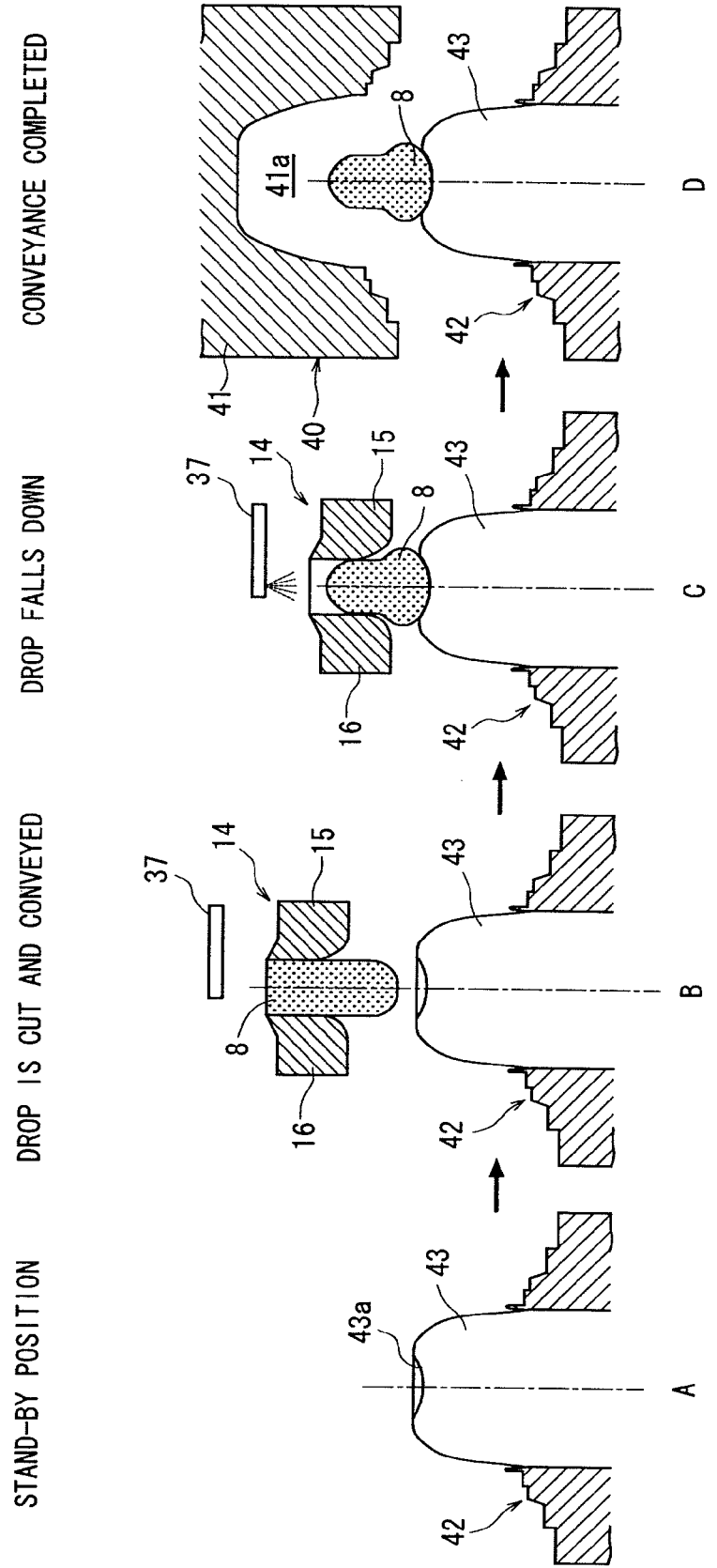
FIG. 15 illustrates a state where the shape of the synthetic resin is pre-molded with the compressed air according to a seventh embodiment of the invention (male mold is the lower mold), wherein A is a sectional view of a state where the male mold is standing by, B is a sectional view of a state where the synthetic resin is conveyed onto the male mold, C is a sectional view of a state where the synthetic resin is placed on the male mold and is pre-molded with the compressed air, and D is a sectional view of a state where the synthetic resin is conveyed onto the male mold.

Referring to FIG. 15D, the metal mold 40 of FIG. 15 has the male mold 42 arranged as the lower mold and the female mold 41 arranged as the upper mold. The male mold 42 has a punch body 43 protruding upward at a central portion thereof. A recessed portion 43a is formed in an upper part of the punch body 43 so as to be dented downward in an arcuate shape to place the synthetic resin 8 thereon. The female mold 41 is forming a cavity 41a that is opening facing downward in the center thereof.

The first holding member 15 and the second holding member 16 of the cutting/holding unit 14 for holding the synthetic resin 8 are constituted in the same manner as those of the above fifth embodiment, and have a length in the up-and-down direction which is shorter than the length of a unit of the synthetic resin 8 that is extruded from the extrusion nozzle 7 and is cut by the cutter 17. Referring to FIG. 15B, while the holding members 15 and 16 are holding the synthetic resin 8, the lower end of the synthetic resin 8 is allowed to protrude downward beyond the lower end of the holding members 15 and 16.

Figure 11:
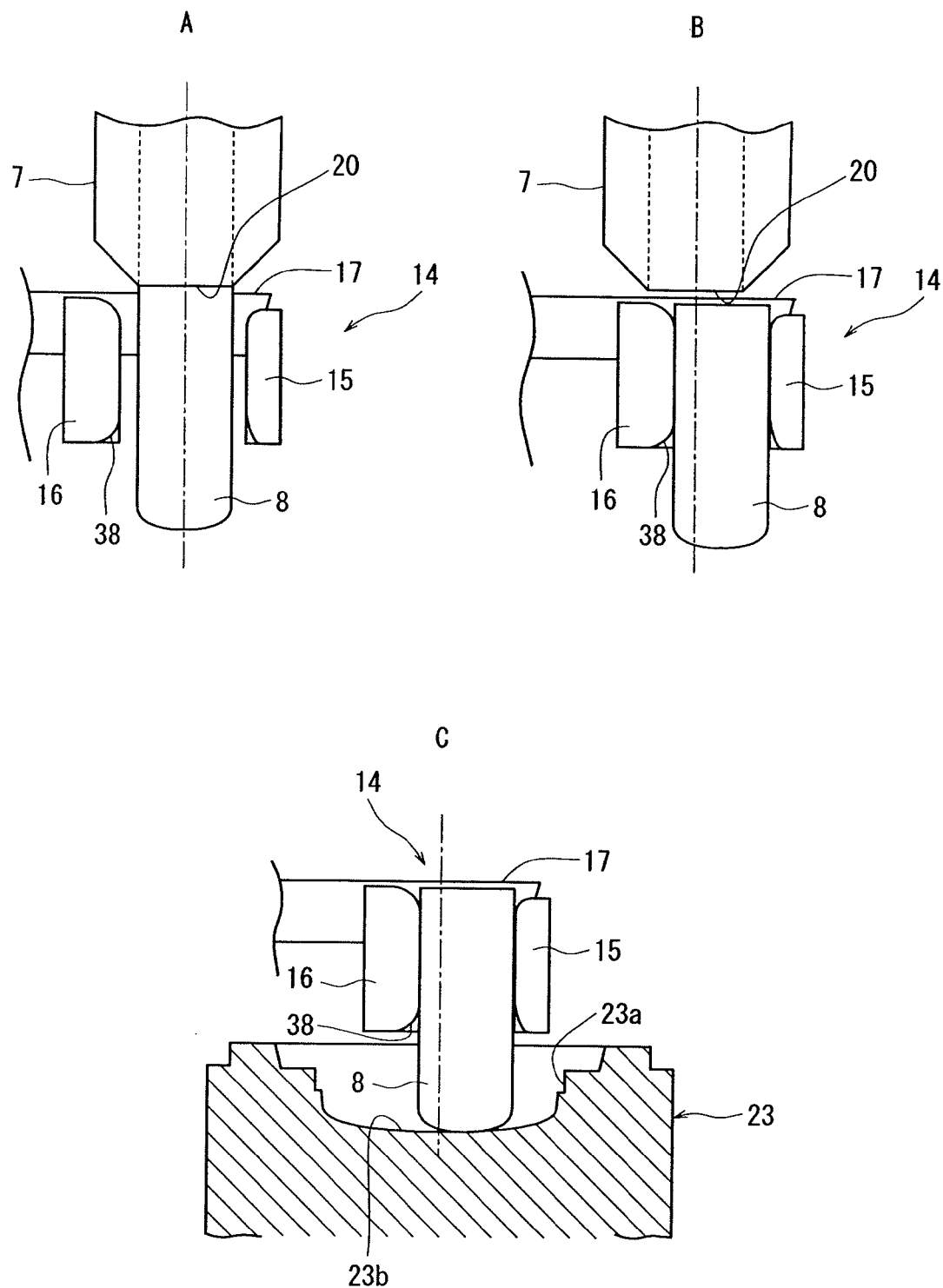
FIG. 11 illustrates the nozzle and the cutting/holding unit of the synthetic resin feeder according to a fifth embodiment of the invention, wherein A is a sectional view of a state where the first and second holding members are opened, B is a sectional view of a state where the first and second holding members are closed, and C is a sectional view of state where the holding members are moved down and the synthetic resin is brought into contact with the bottom surface of the lower mold.

Being constituted as described above, the synthetic resin 8 extruded from the extrusion nozzle 7 is cut by the cutter 17 (see FIG. 11). Referring to FIG. 16B, the holding members 15 and 16 hold the synthetic resin 8 in a manner that the lower end thereof protrudes downward beyond the holding members 15 and 16. When the cutting/holding unit 14 is conveyed to over the punch body 43 of the male mold 42 which is in the stand-by state as shown in FIG. 15B, the synthetic resin 8 is disposed at a position close to the recessed portion 43a of the punch body 43. When their tracks are moved onto the resin feed zone 21 (see FIG. 2) as above, the first and second holding members 15 and 16 of the cutting/holding unit 14 are moved down by lift means which is not shown; i.e., the holding members 15 and 16 move down ward the male mold. The holding members 15 and 16 work to bring the lower end of the synthetic resin 8 into contact with a predetermined position of the recessed portion 43a which is the placing surface of the punch body 43 for placing the synthetic resin 8, and to position the synthetic resin 8 on the recessed portion 43a so as to press or crush the synthetic resin 8 onto the lower end side even after having come in contact. After the synthetic resin 8 is positioned, the holding members 15 and 16 are opened to release the synthetic resin 8 and, thereafter, the holding members 15 and 16 are moved up. Thereafter, the cutting/holding unit 14 separates away from over the track of the metal mold 40.

At this moment, the compressed air is jetted from the jet nozzle 37 onto any portion of the synthetic resin 8 to adjust the shape of the synthetic resin 8 so as to be held being adhered to the recessed portion 43a of the punch body 43 preventing deviation in position. At the time of molding, the synthetic resin 8 is pre-molded in a shape that can be easily compression-molded without deviation in position attaining good directivity for the compression-molding, and can be evenly expanded circumferentially. The container (or lid, preform, etc.) that is compression-molded is taken out from the metal mold 40 after cooled.

The above fifth embodiment requires a contrivance for compression-molding a container having a deep bottom as described above. According to the seventh embodiment, however, the punch body 43 of the male mold 42 does not interfere with the holding members 15 and 16 offering an effect that the embodiment can be applied unconditionally to the containers having a deep bottom.

Next, an eighth embodiment of the invention will be described with reference to FIGS. 16 and 17. The same portions as those of the above third and sixth embodiments are described by attaching the same reference numerals.

This embodiment uses the same metal mold as the metal mold 30 (see FIG. 13) described in the above sixth embodiment, but what makes a difference is that the cutting/holding unit 14 is not provided with the jet nozzle 37 and the metal mold is provided with a lift rod 51.

Figure 16:
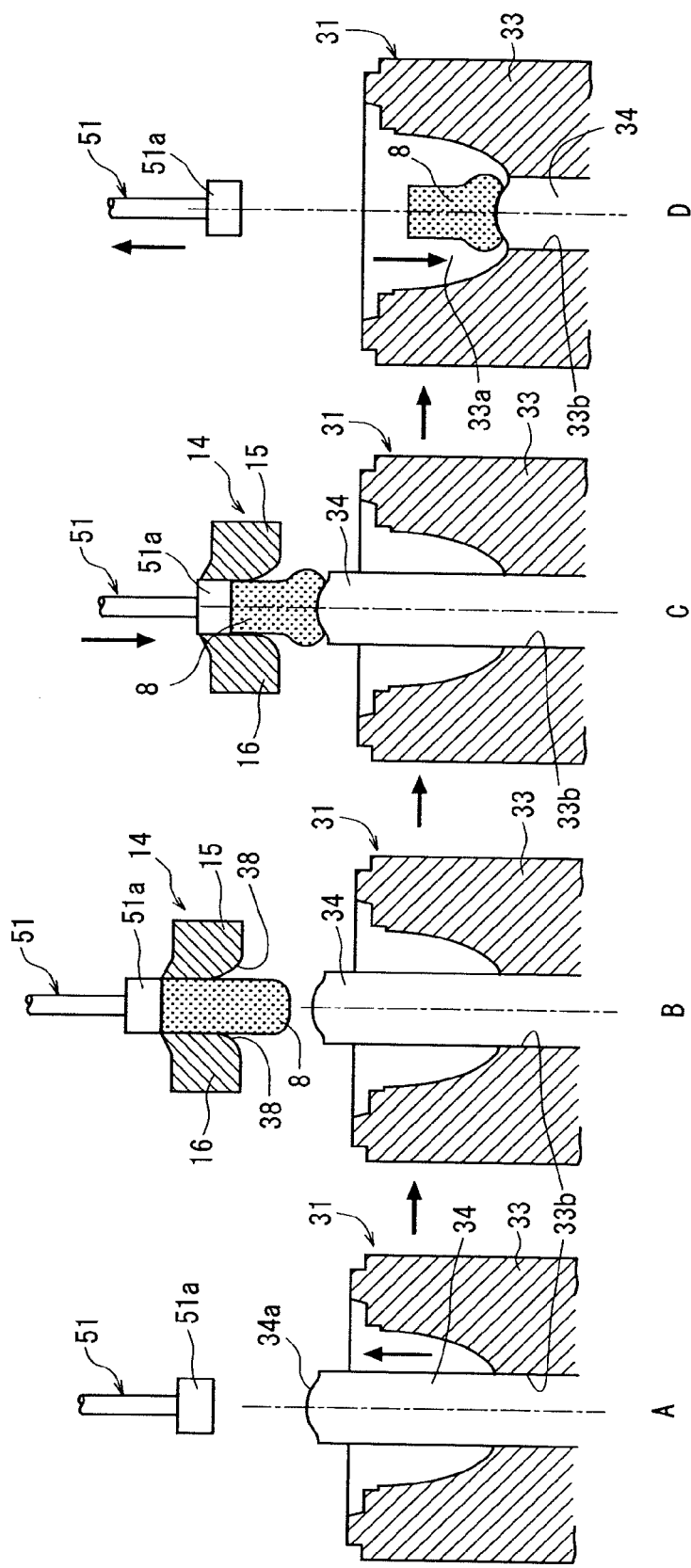
FIG. 16 illustrates a state where the shape of the synthetic resin is pre-molded with the pusher according to an eighth embodiment of the invention, wherein A is a sectional view of a stand-by state where the moving rod has moved up, B is a sectional view of a state where the synthetic resin is conveyed onto the female mold, C is a sectional view of a state where the synthetic resin is placed on the moving rod and is pre-molded, and D is a sectional view of a state where the moving rod has moved down.

Referring to FIG. 16, the female mold 31 includes the female mold body 33 and the moving rod 34. The female mold body 33 forms a cavity 33a on the upper side in the central portion thereof (see FIG. 16D) and a slide hole 33b communicated with the lower part of the cavity 33a. The moving rod 34 of a cylindrical shape is allowed to move up and down in the slide hole 33b being driven by drive means, and can be brought to an upper position shown in FIG. 16A and to a lower position shown in FIG. 16D. The upper end of the moving rod 34 is forming the placing surface 34a formed in an upwardly protruding mild arcuate shape for placing the synthetic resin 8 thereon.

Referring to FIGS. 16B and 16C, the first holding member 15 and the second holding member 16 of the cutting/holding unit 14 for holding the synthetic resin 8 are constituted in the same manner as those of the above fifth embodiment, and have a length in the up-and-down direction which is shorter than the length of a unit of the synthetic resin 8 that is extruded from the extrusion nozzle 7 and is cut by the cutter 17 so that when the holding members 15 and 16 are holding the synthetic resin 8, the lower end of the synthetic resin 8 is allowed to protrude downward beyond the lower end of the holding members 15 and 16.

The lift rod 51 having an axis in the up-and-down direction is disposed over the female mold 31, and a pusher 51a is attached to an end (lower end) of the lift rod 51 to push the synthetic resin 8 toward the female mold. The lift rod 51 can be moved up and down, and is so disposed that the pusher 51a faces the placing surface 34a of the moving rod 34. In this embodiment, the lift rod 51 and the moving rod 34 have their axes in agreement on a straight line. Referring to FIG. 16B, the cutting/holding unit 14 and the female mold 31 have their tracks brought into agreement with each other, and the cutting/holding unit 14 is disposed between the lift rod 51 and the female mold 31. The pusher 51a of the lift rod 51 is so constituted as to pass through the holding portion of the cutting/holding unit 14 for holding the synthetic resin 8.

Figure 17:
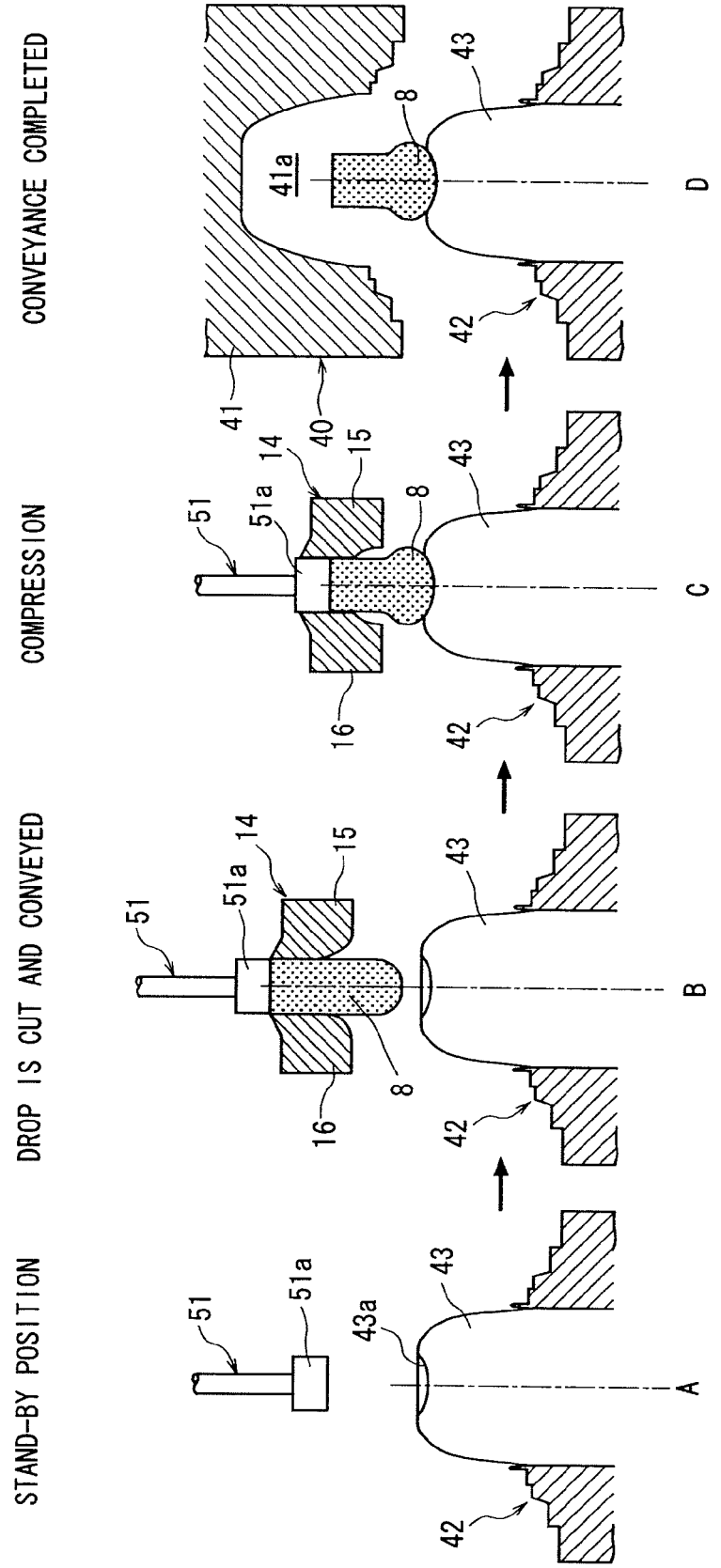
FIG. 17 illustrates a state where the shape of the synthetic resin is pre-molded with the pusher according to a ninth embodiment of the invention (male mold is the lower mold), wherein A is a sectional view of a state where the male mold is standing by, B is a sectional view of a state where the synthetic resin is conveyed onto the male mold, C is a sectional view of a state where the synthetic resin is placed on the male mold and is pre-molded with the pusher, and D is a sectional view of a state where the synthetic resin is conveyed onto the male mold.

FIG. 17 illustrates the shapes of the pusher 51, wherein the pusher 51a shown in FIG. 17A has a flat surface at the end thereof, the pusher 51b shown in FIG. 17B has a protruded spherical shape at the end thereof, and the pusher 51c shown in FIG. 17C has a recessed spherical shape at the end thereof, suitably differing depending upon the shape of the molded article. Here, the lift rod 51 may be attached to the cutting/holding unit 14.

Being constituted as described above, the holding members 15 and 16 hold the synthetic resin 8 in a manner that the lower end thereof protrudes downward beyond the holding members 15 and 16 as shown in FIG. 16B. In the female mold 31 as shown in FIG. 16A, the lift rod 51 is disposed at the elevated position with the moving rod 34 in the stand-by state at the elevated position. When the cutting/holding unit 14 is positioned over the female mold 31 of the compression-molding apparatus 4, the placing surface 34a of the moving rod 34 for placing the synthetic resin 8 is disposed just over the synthetic resin 8 as shown in FIG. 16B. Thereafter, the holding members 15 and 16 of the cutting/holding unit 14 are moved down by lift means that is not shown; i.e., the holding members 15 and 16 move down toward the female mold 31. The holding members 15 and 16 work to bring the lower end of the synthetic resin 8 into contact with a predetermined position on the placing surface 34 of the moving rod 34 of the female mold 31 on which the synthetic resin 8 is to be placed, and to position the synthetic resin 8 on the placing surface 34a so as to press or crush the synthetic resin 8 onto the lower end side even after having come in contact.

Thereafter, the lift rod 51 moves down, enters into the first and second holding members 15 and 16, and pre-molds the synthetic resin 8 depending upon the shape of the end surface of the pusher 51a. For example, the synthetic resin 8 is pre-molded in a direction in which the synthetic resin 8 is to be expanded at the time of compression-molding (in a direction in which the molten resin expands less if there is any such a direction or in a direction in which the thickness must be increased if dissimilar shapes are included). Here, varying the shape of the synthetic resin 8 is not interrupted since the flaring portion 38 has been formed in the lower portions of the first and second holding members 15 and 16.

After the synthetic resin 8 is pre-molded, the holding members 15 and 16 are opened to release the synthetic resin 8 and, thereafter, the holding members 15 and 16 are moved up. Thereafter, the cutting/holding unit 14 separates away from over the track of the metal mold 22.

Thus, the lift rod 51 returns back to the elevated position, the cutting/holding unit 14 separates away from over the female mold 31 as shown in FIG. 16D, and the moving rod 34 moves together with the synthetic resin 8 down to the lowered position. The synthetic resin 8 is adjusted for its shape and is so held as to adhere to the placing surface 34a of the moving rod 34. Therefore, the synthetic resin 8 is prevented from deviating in position and is disposed on the placing surface 34a at a correct position.

Next, the male mold 32 moves down and is overlapped on the female mold 31 whereby the core mold 36 moves down to compress the synthetic resin 8 and, therefore, to mold the container. At the time of the molding, the synthetic resin 8 is pre-molded into a shape that can be easily compression-molded without deviation in position attaining good directivity for the compression-molding, and can be evenly expanded circumferentially.

The container (or preform or the like) that is compression-molded is taken out from the metal mold 30 after cooled.

The above fifth embodiment requires a contrivance for compression-molding a container having a deep bottom as described above. According to the eighth embodiment, however, the moving rod 34 moves up to meet the synthetic resin 8 offering an effect that the embodiment can be applied unconditionally to the containers having a deep bottom.

Next, a ninth embodiment of the invention will be described.

In this embodiment, the male mold is arranged as the lower mold and the lift rod 51 of the above fourth and eighth embodiments is used instead of the jet nozzle 37 of the above seventh embodiment.

Referring to FIG. 17, the male mold 42 has, in the center portion thereof, a punch body 43 protruding upward, and a recessed portion 43a is formed in the upper part of the punch body 43 so as to be dented downward. The female mold 41 is forming a cavity 41a in the center thereof.

The holding members 15 and 16 have a length in the up-and-down direction which is shorter than the length of a unit of the synthetic resin 8 that is extruded from the extrusion nozzle 7 and is cut by the cutter 17. While the holding members 15 and 16 are holding the synthetic resin 8, the lower end of the synthetic resin 8 is allowed to protrude downward beyond the lower ends of the holding members 15 and 16.

The lift rod 51 having an axis in the up-and-down direction is disposed over the male mold 42, and a pusher 51a is attached to an end (lower end) of the lift rod 51 to push the synthetic resin 8 toward the male mold. The lift rod 51 can be moved up and down, and is so disposed that the pusher 51a faces the recessed portion 43a of the punch body 43. Referring to FIG. 17B, when the cutting/holding unit 14 and the male mold 42 have their tracks brought into agreement with each other, the cutting/holding unit 14 can be disposed between the lift rod 51 and the male mold 42. The pusher 51a of the lift rod 51 is so constituted as to pass through the holding portion of the cutting/holding unit 14 for holding the synthetic resin 8.

Being constituted as described above, the holding members 15 and 16 hold the synthetic resin 8 in a manner that the lower end thereof protrudes downward beyond the holding members 15 and 16 as shown in FIG. 17B.

When the cutting/holding unit 14 is conveyed to over the punch body 43 of the male mold 42 which is in the stand-by state, the synthetic resin 8 is disposed at a position close to the recessed portion 43a of the punch body 43. When their tracks are moved onto the resin feed zone 21 (see FIG. 2), the first and second holding members 15 and 16 of the cutting/holding unit 14 are moved down by lift means which is not shown; i.e., the holding members 15 and 16 move down toward the male mold. The holding members 15 and 16 work to bring the lower end of the synthetic resin 8 into contact with a predetermined position of the recessed portion 43a which is the placing surface of the punch body 43 for placing the synthetic resin 8, and to position the synthetic resin 8 on the recessed portion 43a so as to press or crush the synthetic resin 8 onto the lower end side even after having come in contact.

Next, as shown in FIG. 17C, the lift rod 51 moves down, enters into the first and second holding members 15 and 16, and pushes the synthetic resin 8 onto the recessed portion 43a of the punch body 43. Here, the synthetic resin 8 can be pre-molded depending upon the shape of the end surface of the pusher 51a of the lift rod 51. Here, varying the shape of the synthetic resin 8 is not interrupted since the flaring portion 38 has been formed in the lower portions of the first and second holding members 15 and 16.

Thereafter, the pusher 51a is moved up, the holding members 15 and 16 are opened to release the synthetic resin 8 and, thereafter, the holding members 15 and 16 are moved up. Thereafter, the cutting/holding unit 14 separates away from over the track of the metal mold 40.

Thus, the synthetic resin 8 is adjusted for its shape and is so held as to adhere to the recessed portion 43a of the punch body 43. Therefore, the synthetic resin 8 is prevented from deviating in position and is disposed at a correct position.

Next, the female mold 31 moves down and is overlapped on the male mold 32 to compress the synthetic resin 8 and, therefore, to mold the container. At the time of the molding, the synthetic resin 8 is pre-molded into a shape that can be easily compression-molded without deviation in position attaining good directivity for the compression-molding, and can be evenly expanded circumferentially.

The container (or preform or the like) that is compression-molded is taken out from the metal mold 30 after cooled.

The above fifth embodiment requires a contrivance for compression-molding a container having a deep bottom as described above. According to the ninth embodiment, however, the punch body 43 of the male mold 42 does not interfere with the holding members 15 and 16 offering an effect that the embodiment can be applied unconditionally to the containers having a deep bottom.

Next, a tenth embodiment of the invention will be described.

Figure 18:
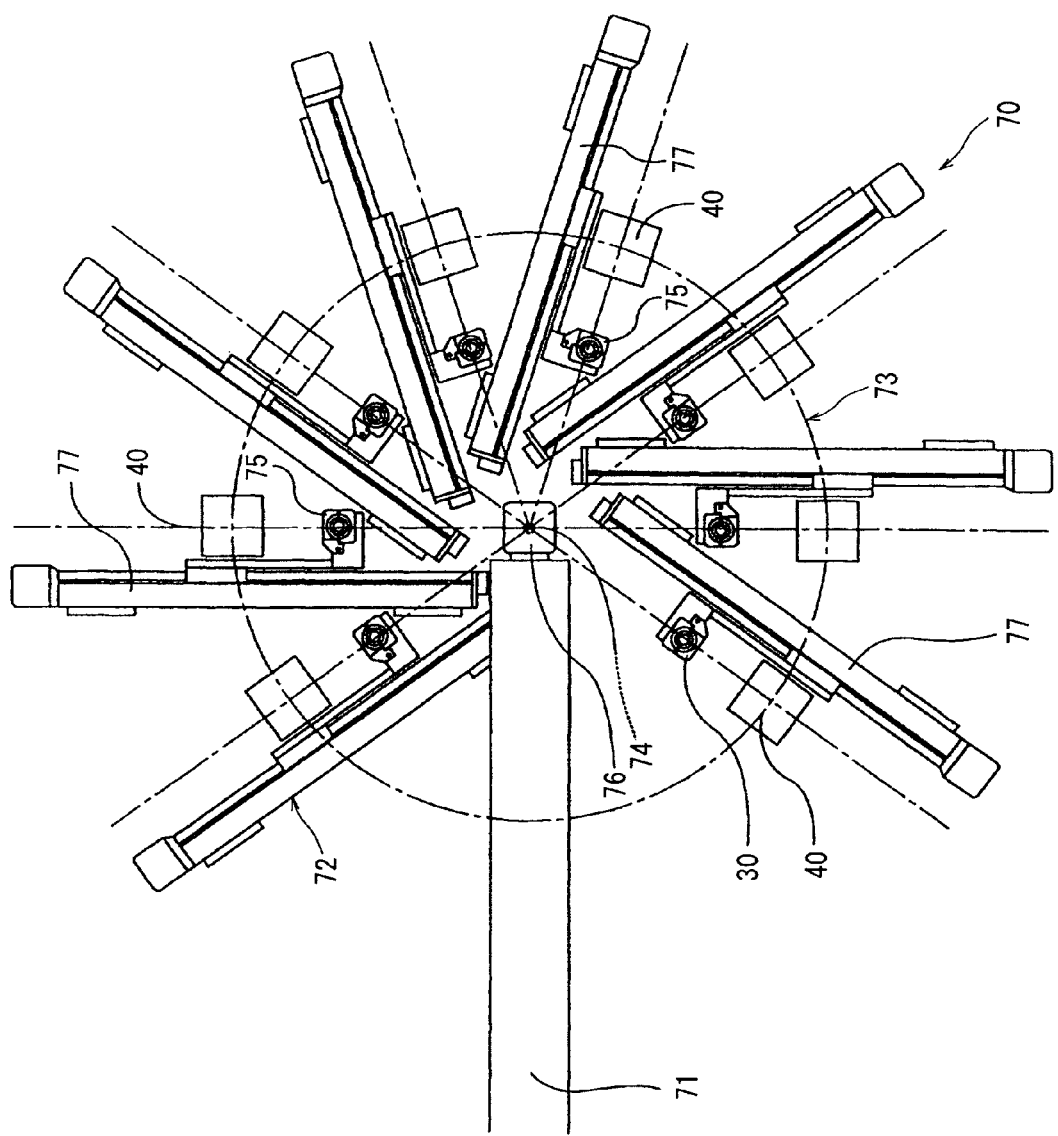
FIG. 18 is a plan view schematically illustrating the molding system for putting into practice a tenth embodiment of the compression-molding apparatus of the invention.
Figure 19:
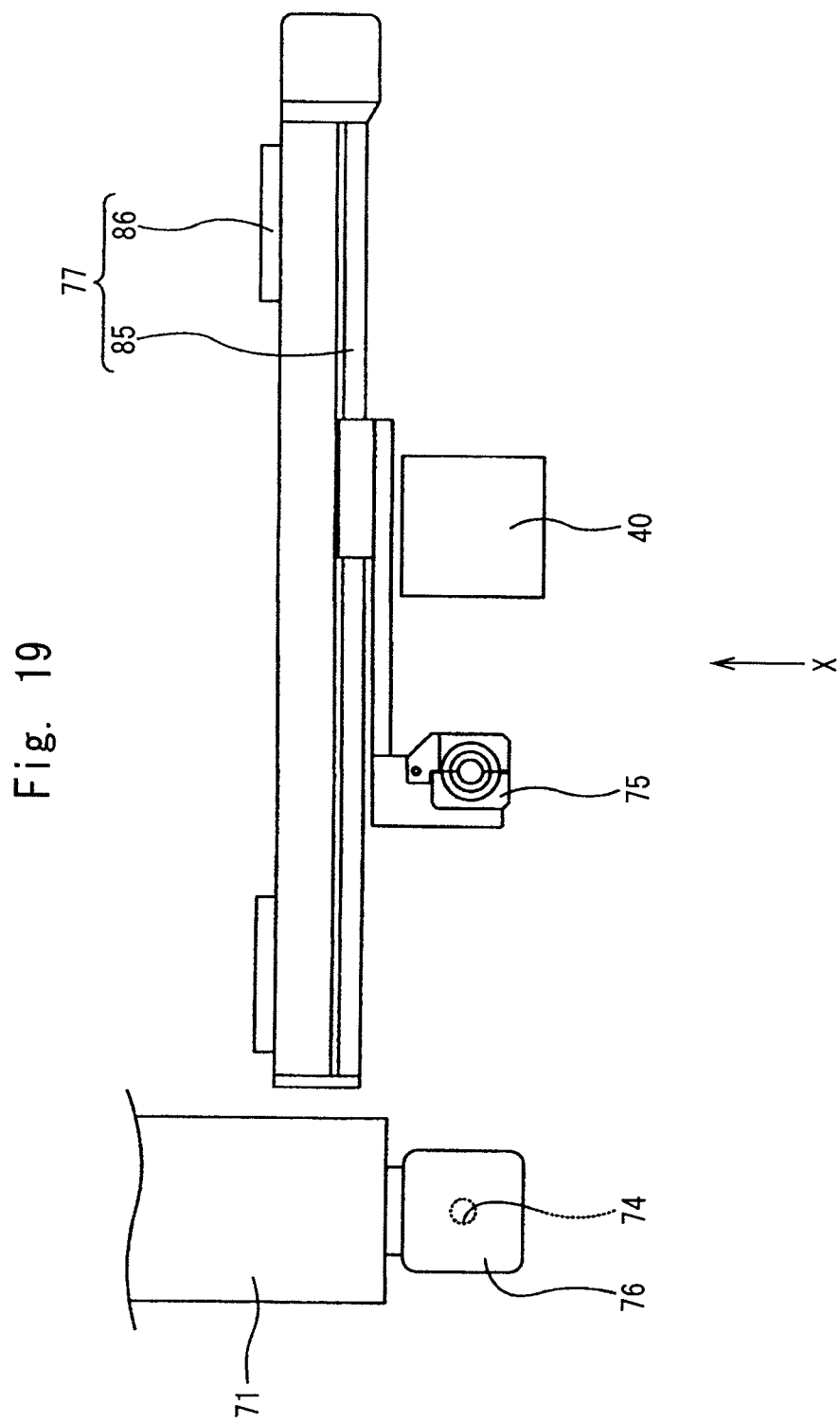
FIG. 19 is a plan view illustrating, on an enlarged scale, major portions of one of a plurality of conveyer means arranged about the extrusion nozzle of an extruder in the molding system of FIG. 18.

FIG. 18 is a plan view schematically illustrating a molding system according to an embodiment of the invention, and FIG. 19 is a plan view illustrating, on an enlarged scale, any one of a plurality of cutting/holding units 75 arranged about an extrusion nozzle 74 of an extruder 71 of the molding system 70.

The molding system 70 includes the extruder 71 which melts and kneads the synthetic resin and extrudes it through the extrusion nozzle 74, the plurality of cutting/holding units 75 arranged about the extrusion nozzle 74 of the extruder 71, and a plurality of compression metal molds 40 arranged together with the cutting/holding units 75 in pairs.

The extruder 71 is so provided that the extrusion nozzle 74 that is opened in a die head 76 thereof extrudes the resin in a molten state nearly downward along the vertical direction.

In the diagramed embodiment, the cutting/holding units 75 arranged about the extrusion nozzle 74 that extrudes the molten resin are mounted on a plurality of drive mechanisms 77 that are nearly radially installed about the extrusion nozzle 74, and move alternately and reciprocally between a position under the extrusion nozzle 74 and the feed positions set for the cutting/holding units 75. At the feed positions set for the cutting/holding units 75, compression metal molds 40 are installed in pairs with the cutting/holding units 75.

FIG. 20 is a view schematically illustrating the cutting/holding unit 75, wherein FIG. 20A is a plan view and FIG. 20B is a sectional view along Y-Y of FIG. 20A.

The cutting/holding unit 75 has a cutter 81 for cutting the molten resin extruded from the extrusion nozzle 74 at the time when it passes under the extrusion nozzle 74 toward the compression metal mold 40 installed at the feed position. The cutter 81 is formed along the circumferential edge at the upper part of the holding member 82. The inner circumferential surface of the holding member 82 serves as a holding surface 84 and comes in contact with the side surface of the molten resin 8 that is cut by the cutter 81.

On one holding member 82 of the cutting/holding member 75, the other holding member 83 is attached thereto facing the holding surface 84 so as to be opened and closed. The other holding member 83 is opened and closed about a rotary shaft 87 being driven by, for example, a rotary actuator or the like that is not shown. At the time when the cutting/holding unit 75 passes under the extrusion nozzle 74, the other holding member 83 is at its open position (two-dot chain lines in FIG. 20A) so will not to hinder the molten resin from being cut by the cutter 81, and is closed (solid lines in FIG. 20A) after the molten resin is cut. Here, the molten resin extruded from the extrusion nozzle 74 must be cut into such a length that protrudes downward beyond the lower end of the holding surface 84.

Upon closing the holding member 83, the molten resin 8 that is cut is held in a cylindrical space between the holding surface 84 and the holding member 83. The molten resin 8 can be fed into the mold 40 when the cutting/holding unit 75 comes into a halt at the feed position.

The drive mechanism 77 shown in FIG. 19 includes a horizontal drive actuator 85 for reciprocally moving the cutting/holding unit 75 in a horizontal direction and a vertical drive actuator 86 for moving them up and down in a vertical direction. The vertical drive actuator 86 moves the cutting/holding unit 75 up and down along a guide support member (not shown) that extends in the vertical direction and supports the cutting/holding unit 75.

Figure 21:
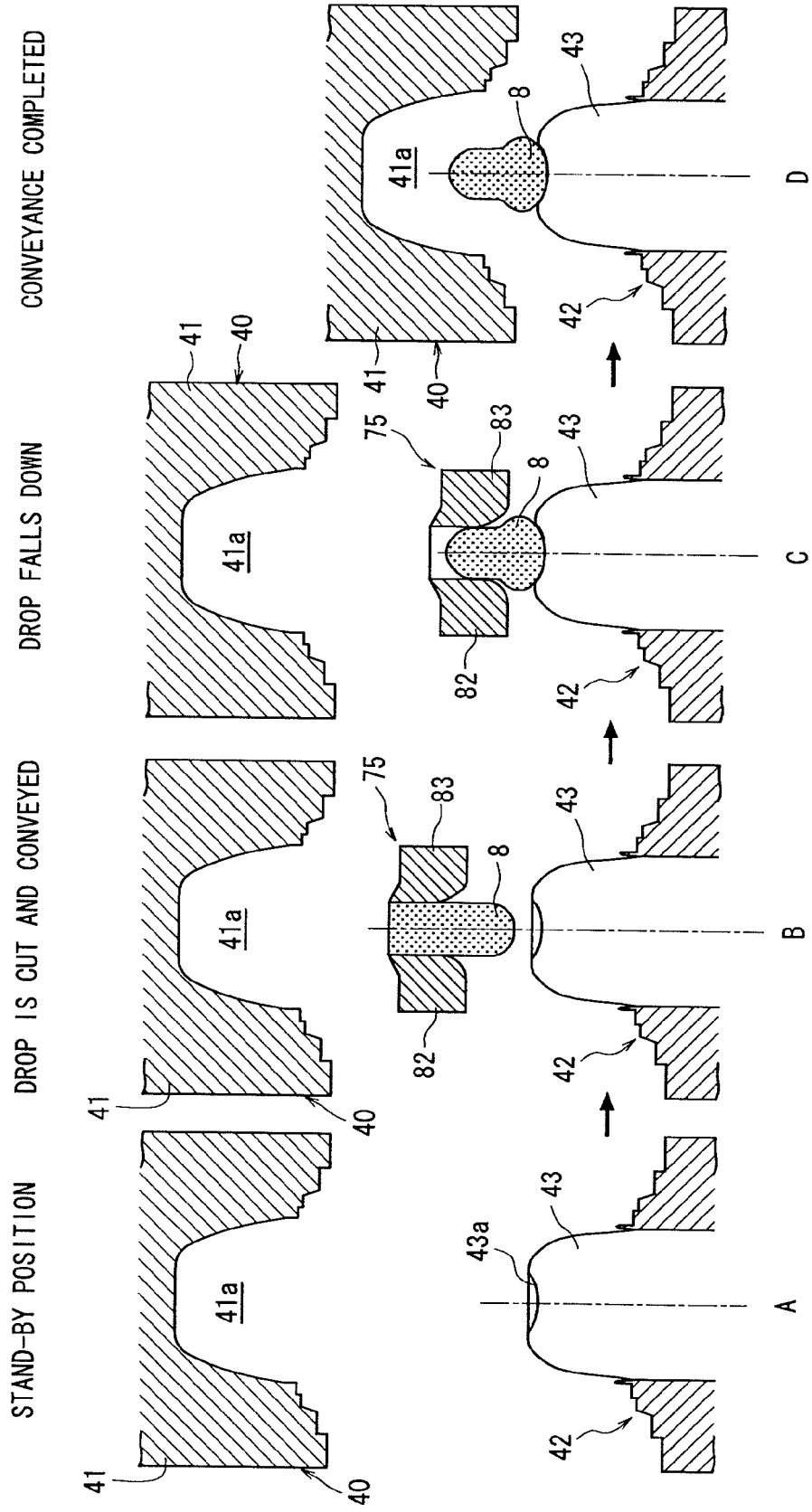
FIG. 21 illustrates a state where the synthetic resin is compressed according to the tenth embodiment of the invention, wherein A is a sectional view of a state where the male mold is standing by, B is a sectional view of a state where the synthetic resin is conveyed onto the male mold, C is a sectional view of a state where the synthetic resin is placed on the male mold, and D is a sectional view of a state where the synthetic resin is conveyed onto the male mold.

Referring to FIGS. 21B to 21D, the metal mold 40 of FIG. 21 has the male mold 42 arranged as the lower mold and the female mold 41 arranged as the upper mold as described in the above first, fourth, seventh and ninth embodiments. The male mold 42 is provided with the punch body 43 protruding upward at the central portion thereof, and the recessed portion 43a is formed in the upper part of the punch body 43 in a downwardly dented arcuate shape for placing the synthetic resin 8. The female mold 41 is forming the cavity 41a that is open at the center thereof facing downward.

Being thus constituted, the synthetic resin 8 extruded from the extrusion nozzle 74 is cut by the cutter 81, and the holding members 82 and 83 hold the synthetic resin 8 in a manner that the lower end thereof protrudes downward beyond the holding members 82 and 83 as shown in FIG. 16B. When the cutting/holding unit 75 is conveyed to over the punch body 43 of the male mold 42 which is in the stand-by state as shown in FIG. 21B, the synthetic resin 8 is disposed at a position close to the recessed portion 43a. When their tracks have moved onto the resin feed zone as described above, lift means equipped with the vertical drive actuator 86 of the cutting/holding unit 75 causes the holding members 82 and 83 to move down; i.e., the holding members 82 and 83 move down toward the male mold. The holding members 82 and 83 work to bring the lower end of the synthetic resin 8 into contact with the predetermined position of the recessed portion 43a which is the placing surface of the punch body 43 for placing the synthetic resin 8 and to position the synthetic resin 8 on the recessed portion 43a so as to push or crush the synthetic resin 8 toward the lower end side even after the synthetic resin 8 has come in contact. After the synthetic resin 8 is positioned, the holding members 82 and 83 are opened to release the synthetic resin 8. Thereafter, the holding members 82 and 83 are moved up. Then, the cutting/holding unit 75 separates away from the metal mold 40.

Thus, the synthetic resin 8 is so held as to adhere to the recessed portion 43a of the punch body 43 preventing deviation in position. At the time of molding, there is no deviation in position attaining good directivity for the compression-molding, and the synthetic resin 8 can be evenly expanded circumferentially. The container (or lid, preform, etc.) that is compression-molded is taken out from the metal mold 40 after cooled.

Though the invention was described above by way of embodiments, the invention can be further varied or modified in a variety of ways based upon the technical spirit of the invention, as a matter of course.

Further, the compression-molding apparatus is not limited to the one having many cutting/holding units 14 and metal molds that rotate continuously but may be the one that takes one each time. Moreover, the cutting/holding units in the above first to ninth embodiments may be replaced by those of the linear conveyance type described in the tenth embodiment.

Though the invention was described above by way of embodiments, the invention can be further varied or modified in a variety of ways based upon the technical spirit of the invention, as a matter of course.

Figure 22:
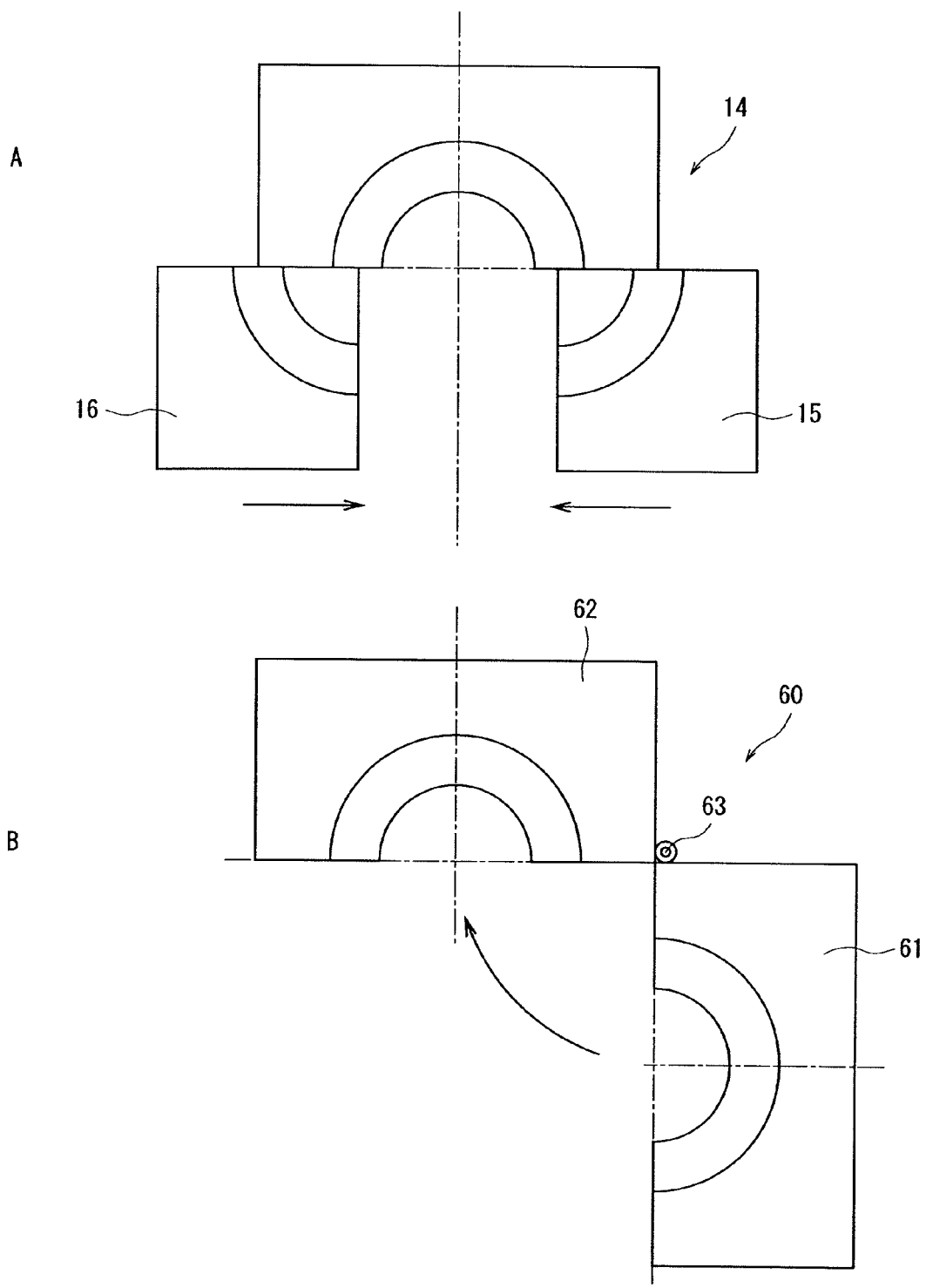
FIG. 22 A is a plan view of the cutting/holding unit according to any one of the embodiments of the invention, and B is a plan view thereof according to a modified embodiment.

Referring to FIGS. 22A and 20, the cutting/holding units 14, 75 in the above embodiments are of the so-called three-split type (three parts) of which the holding members 15 and 16 (82 and 83) move back and forth in a horizontal direction. As shown in FIG. 22B, however, the cutting/holding unit 60 may be of the two-split type (two parts) in which a hinge 63 is formed at a portion connecting the holding members 61 and 62 so that either one of the holding member 61 or 62 turns to open or close.

The jet nozzle 37 was provided for the cutting/holding unit 14 in the above embodiments, but may be provided for the resin feed zone 21 shown in FIG. 2 or may be provided for the metal mold. Similarly, the lift rod 51 was provided for the metal mold. The lift rod 51, however, may be provided for the resin feed zone 21 or for the cutting/holding unit 14.

Moreover, the jet nozzle 37 and the lift rod 51 may be provided as described in the above tenth embodiment.

The invention claimed is:

1. A compression-molding apparatus comprising:
a female mold member comprising a centrally disposed member and a circumferential member surrounding the centrally disposed member;
the centrally disposed member and the circumferential member defining an upwardly open recessed molding portion when an upper surface of the centrally disposed member is disposed in a first position;
a male mold member arranged over the female mold member and that can move up and down relative to the female mold member;
the male mold member being movable into a closed position so as to define a molding space in cooperation with the female mold member and to an open position wherein the male mold member is spaced away from the female mold member;
a cutting/holding unit:
positionable between the male mold member and the female mold member when the male mold member is in the open position;
being structured and arranged to hold a synthetic resin material and to feed the synthetic resin material into the female mold member;
comprising a jet nozzle producing a gas stream; and
comprising a holding member for holding the synthetic resin material, wherein the holding member has a lower end that includes a flared section that is flared downwardly so as to allow the synthetic resin material to be premolded while held by the holding member,
the upper surface of the centrally disposed member being disposed at a second position higher than the first position when the synthetic resin material is fed from the cutting/holding unit,
wherein, prior to the synthetic resin material being fed to the female mold member, the synthetic resin material is forced into the holding member by the gas stream and held in the holding member and premolded via the flared section and a gas stream, and
wherein, after the synthetic resin material is premolded, the synthetic resin material is positioned onto the upper surface of the centrally disposed member.

2. The apparatus of claim 1, wherein the synthetic resin material is positioned onto the upper surface of the centrally disposed member after the centrally disposed member is moved up to a position where the upper surface is arranged above an upper surface of the circumferential member.

3. The apparatus of claim 1, wherein the cutting/holding unit and the female mold member are rotatable and are movable into a resin feed zone, whereby the synthetic resin material can be fed onto the upper surface of the centrally disposed member.

4. A compression-molding apparatus comprising:
a female mold member comprising a centrally disposed member and a circumferential member surrounding the centrally disposed member;
the centrally disposed member and the circumferential member defining an upwardly open recessed molding portion when an upper surface of the centrally disposed member is disposed in a first position;
a male mold member arranged over the female mold member and that can move up and down relative to the female mold member;
the male mold member being movable into a closed position so as to define a molding space in cooperation with the female mold member and to an open position wherein the male mold member is spaced away from the female mold member;
a cutting/holding unit:
positionable between the male mold member and the female mold member when the male mold member is in the open position;

being structured and arranged to hold a synthetic resin material and to feed the synthetic resin material into the female mold member;

comprising a push-down member; and comprising a holding member for holding the synthetic resin material, wherein the holding member has a lower end that includes a flared section that is flared downwardly so as to allow the synthetic resin material to be premolded while held by the holding member, the upper surface of the centrally disposed member being disposed at a second position higher than the first position when the synthetic resin material is fed from the cutting/holding unit, wherein, prior to the synthetic resin material being fed to the female mold member, the synthetic resin material is pushed down with the push-down member and premolded.

5. The apparatus of claim 4, wherein the synthetic resin material is premolded via the flared section, the push-down member, and the upper surface of the centrally disposed member.

6. The apparatus of claim 4, wherein the synthetic resin material is positioned onto the upper surface of the centrally disposed member after the centrally disposed member is moved up to a position where the upper surface is arranged above an upper surface of the circumferential member.

7. The apparatus of claim 4, wherein the cutting/holding unit and the female mold member are rotatable and are movable into a resin feed zone, whereby the synthetic resin material can be fed onto the upper surface of the centrally disposed member.

8. A compression-molding apparatus comprising:
   a female mold member defining a downwardly open recessed molding portion;
   a male mold member arranged below the female mold member and that can move up and down relative to the female mold member;
   the male mold member being movable into a closed position so as to define a molding space in cooperation with the female mold member and to an open position wherein the male mold member is spaced away from the female mold member;
   a cutting/holding unit:
      positionable between the male mold member and the female mold member when the male mold member is in the open position;
      being structured and arranged to hold a synthetic resin material and to feed the synthetic resin material onto the male mold member;
   comprising a jet nozzle; and
   comprising a holding member for holding the synthetic resin material, wherein the holding member has a lower end that includes a flared section that is flared downwardly so as to allow the synthetic resin material to be premolded while held by the holding member,
   wherein the synthetic resin material is forced downward by a gas stream and premolded utilizing the gas stream and the flared section.

9. The apparatus of claim 8, wherein the jet nozzle produces the gas stream and the synthetic resin material is fed onto the male mold member after being premolded.

10. The apparatus of claim 8, wherein the jet nozzle produces the gas stream and the synthetic resin material is premolded via also the male mold member.

11. The apparatus of claim 8, wherein the synthetic resin material is positioned onto an upper surface of a centrally disposed member of the male mold member after the male mold member is moved up to a position adjacent the holding member.

12. The apparatus of claim 8, wherein the cutting/holding unit and the male mold member are rotatable and are movable into a resin feed zone, whereby the synthetic resin material can be fed onto an upper surface of the male mold member.

13. A compression-molding apparatus comprising:
   a female mold member defining a downwardly open recessed molding portion;
   a male mold member arranged below the female mold member and that can move up and down relative to the female mold member;
   the male mold member being movable into a closed position so as to define a molding space in cooperation with the female mold member and to an open position wherein the male mold member is spaced away from the female mold member;
   a cutting/holding unit:
      positionable between the male mold member and the female mold member when the male mold member is in the open position;
      being structured and arranged to hold a synthetic resin material and to feed the synthetic resin material into the male mold member;
   comprising a push-down member; and
   comprising a holding member for holding the synthetic resin material wherein the holding member has a lower end that includes a flared section that is flared downwardly so as to allow the synthetic resin material to be premolded while held by the holding member,
   wherein the synthetic resin material is pushed down with the push-down member and premolded.

14. The apparatus of claim 13, wherein the synthetic resin material is premolded via the flared section, the push-down member, and an upper surface of the male mold member.

15. The apparatus of claim 13, wherein the synthetic resin material is positioned onto an upper surface of the male mold member after the male mold member is moved upward.

16. The apparatus of claim 13, wherein the cutting/holding unit and the male mold member are rotatable and are movable into a resin feed zone, whereby the synthetic resin material can be fed onto the upper surface of the male mold member.

* * * * *